(12) United States Patent
Oh et al.

(10) Patent No.: US 12,189,980 B2
(45) Date of Patent: Jan. 7, 2025

(54) STORAGE DEVICE AND OPERATING METHOD OF STORAGE CONTROLLER

(71) Applicant: SAMSUNG ELECTRONICS CO., LTD., Suwon-si (KR)

(72) Inventors: Eun Chu Oh, Suwon-si (KR); Beomkyu Shin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/136,041

(22) Filed: Apr. 18, 2023

(65) Prior Publication Data

US 2024/0069789 A1    Feb. 29, 2024

(30) Foreign Application Priority Data

Aug. 31, 2022    (KR) .................. 10-2022-0110328

(51) Int. Cl.
*G06F 12/00* (2006.01)
*G06F 3/06* (2006.01)
*G06F 12/02* (2006.01)

(52) U.S. Cl.
CPC .......... *G06F 3/0655* (2013.01); *G06F 3/0604* (2013.01); *G06F 3/0679* (2013.01); *G06F 12/0253* (2013.01)

(58) Field of Classification Search
CPC ..... G06F 3/0604; G06F 3/0655; G06F 3/0679
USPC ........................................................ 711/154
See application file for complete search history.

(56) References Cited

U.S. PATENT DOCUMENTS

| | | | |
|---|---|---|---|
| 7,679,133 B2 | 3/2010 | Son et al. | |
| 8,553,466 B2 | 10/2013 | Han et al. | |
| 8,559,235 B2 | 10/2013 | Yoon et al. | |
| 8,654,587 B2 | 2/2014 | Yoon et al. | |
| 9,256,530 B2 | 2/2016 | Oh et al. | |
| 9,645,924 B2 | 5/2017 | Fisher et al. | |
| 9,665,482 B2 | 5/2017 | Hada | |
| 9,864,544 B2 | 1/2018 | Oh et al. | |
| 9,921,766 B2 | 3/2018 | Boitei | |
| 10,353,814 B2 | 7/2019 | Boitei | |
| 10,467,133 B2 | 11/2019 | Perlstein et al. | |

(Continued)

FOREIGN PATENT DOCUMENTS

KR    10-2062045 B1    1/2020

OTHER PUBLICATIONS

Communication dated Jan. 26, 2024, issued by the European Patent Office in counterpart European Application No. 23176316.0.

*Primary Examiner* — Mohamed M Gebril
(74) *Attorney, Agent, or Firm* — Sughrue Mion, PLLC

(57) ABSTRACT

The present disclosure provides storage devices and methods for operating the same. In some embodiments, a storage device includes a non-volatile memory including a plurality of sub-blocks that are independently erasable, and a processor configured to control a garbage collection operation on the plurality of sub-blocks. The plurality of sub-blocks includes a plurality of first sub-blocks that have a first block size and a plurality of second sub-blocks that have a second block size. The second block size is different from the first block size. The processor is further configured to select a victim sub-block with a lowest ratio of a valid page count to an invalid page count from among the plurality of sub-blocks, and copy a valid page of the victim sub-block to a target sub-block from among the plurality of sub-blocks.

20 Claims, 29 Drawing Sheets

(56) References Cited

U.S. PATENT DOCUMENTS

| | | |
|---|---|---|
| 10,613,975 B2 | 4/2020 | Jung et al. |
| 10,802,959 B2 | 10/2020 | You |
| 11,269,767 B2 | 3/2022 | Byun |
| 2011/0233648 A1 | 9/2011 | Seol et al. |
| 2016/0188208 A1* | 6/2016 | Kim .................. G06F 3/0652 711/103 |
| 2016/0328155 A1* | 11/2016 | Um .................. G06F 3/0679 |
| 2019/0146679 A1* | 5/2019 | Doh .................. G06F 3/0659 711/103 |
| 2020/0042440 A1* | 2/2020 | Hsiao ................ G06F 3/0679 |
| 2020/0057562 A1* | 2/2020 | Lee .................. G06F 3/0608 |
| 2020/0097403 A1* | 3/2020 | Saxena .............. G06F 12/0246 |
| 2020/0174668 A1* | 6/2020 | Byun ................ G06F 12/0253 |
| 2020/0409836 A1* | 12/2020 | You .................. G06F 12/0261 |
| 2021/0149598 A1* | 5/2021 | Choi ................ G11C 16/08 |
| 2021/0240613 A1 | 8/2021 | Na |
| 2022/0180948 A1* | 6/2022 | Puthenthermadam ................. G11C 11/5635 |
| 2022/0199184 A1* | 6/2022 | Muchherla ............ G11C 29/52 |
| 2022/0261344 A1* | 8/2022 | Yang ................ G06F 12/0246 |
| 2023/0069260 A1* | 3/2023 | Lien ................ G11C 16/10 |
| 2024/0069789 A1* | 2/2024 | Oh .................. G06F 3/0679 |

\* cited by examiner

|  | SUB_BLK1 | SUB_BLK2 |
|---|---|---|
| VPC | VPCa | VPCb |
| IPC | IPCa | IPCb |
| VID | VIDa | VIDb |

|  | SUB_BLK1 | SUB_BLK2 |
|---|---|---|
| VPC | VPCa | VPCb |
| IPC | IPCa | IPCb |
| VIR | VIRa | VIRb |

|  | SUB_BLK1 | SUB_BLK2 |
|---|---|---|
| VPC | VPCa | VPCb |
| TWC | TWCa | TWCb |
| VTWR | VTWRa | VTWRb |

|      | SUB_BLK1 | SUB_BLK2 |
|------|----------|----------|
| VPC  | VPCa     | VPCb     |
| TPC  | TPCa     | TPCb     |
| VTPR | VTPRa    | VTPRb    |

| GROUP1 | VPC |
|---|---|
| SUB_BLK1a | VPC1a |
| SUB_BLK1b | VPC1b |
| ... | ... |

190C

| GROUP2 | VPC |
|---|---|
| SUB_BLK2a | VPC2a |
| SUB_BLK2b | VPC2b |
| ... | ... |

| GROUP1 | VPC | IPC | VID |
|---|---|---|---|
| SUB_BLK1a | VPC1a | IPC1a | VID1a |
| SUB_BLK1b | VPC1b | IPC1b | VID1b |
| ... | ... | ... | ... |

200C

| GROUP2 | VPC | IPC | VID |
|---|---|---|---|
| SUB_BLK2a | VPC2a | IPC2a | VID2a |
| SUB_BLK2b | VPC2b | IPC2b | VID2b |
| ... | ... | ... | ... |

STORAGE DEVICE AND OPERATING METHOD OF STORAGE CONTROLLER

CROSS-REFERENCE TO RELATED APPLICATION

This application claims benefit of priority under 35 U.S.C. § 119 to Korean Patent Application No. 10-2022-0110328, filed on Aug. 31, 2022, in the Korean Intellectual Property Office, the disclosure of which is incorporated by reference herein in its entirety.

BACKGROUND

1. Field

The present disclosure relates generally to a memory device, and more particularly, to a storage device including a non-volatile memory including sub-blocks having different sizes, and an operating method of a storage controller communicating with the non-volatile memory.

2. Description of Related Art

Memory devices may be used to store data and may be classified into volatile memory devices and non-volatile memory devices. According to a demand for increased capacity and miniaturization of non-volatile memory devices, the number of word lines stacked on a substrate may increase, and accordingly, the size of a memory block may also increase. As the size of a memory block increases, the memory block may be divided into at least two sub-blocks, and an erase operation may be performed in units of sub-blocks. In the case of a non-volatile memory device, a garbage collection operation may be performed to secure a free block. In this regard, when a victim sub-block is selected without considering a size difference between sub-blocks, the efficiency of the garbage collection operation and the performance of a storage device may degrade.

SUMMARY

The present disclosure provides a storage device capable of improving efficiency of a garbage collection operation on a non-volatile memory including sub-blocks having different sizes, and an operating method of a storage controller.

According to an aspect of the present disclosure, a storage device is provided. The storage device includes a non-volatile memory including a plurality of sub-blocks that are independently erasable, and a processor configured to control a garbage collection operation on the plurality of sub-blocks. The plurality of sub-blocks includes a plurality of first sub-blocks and a plurality of second sub-blocks. Each first sub-block of the plurality of first sub-blocks is coupled to a first word line group and has a first block size. The first word line group includes a plurality of first word lines stacked in a vertical direction. Each second sub-block of the plurality of second sub-blocks is coupled to a second word line group and has a second block size. The second block size is different from the first block size. The second word line group includes a plurality of second word lines stacked in the vertical direction. The processor is further configured to select a victim sub-block with a lowest ratio of a valid page count to an invalid page count from among the plurality of sub-blocks, and copy a valid page of the victim sub-block to a target sub-block from among the plurality of sub-blocks.

According to an aspect of the present disclosure, a storage device is provided. The storage device includes a non-volatile memory including first sub-blocks and second sub-blocks and a processor configured to independently control a first garbage collection operation on the first sub-blocks and a second garbage collection operation on the second sub-blocks. Each of the first sub-blocks has a first block size and includes a first plurality of memory cells. Each of the second sub-blocks has a second block size and includes a second plurality of memory cells, The second block size is different from the first block size. The processor is further configured to copy a valid page of a first victim sub-block from among the first sub-blocks to a first target sub-block from among the first sub-blocks, based on a first garbage collection management table of the first sub-blocks. The first victim sub-block has a lowest valid page count from among the first sub-blocks. The processor is further configured to copy a valid page of a second victim sub-block from among the second sub-blocks to a second target sub-block from among the second sub-blocks, based on a second garbage collection management table of the second sub-blocks. The second victim sub-block has a lowest valid page count from among the second sub-blocks.

According to an aspect of the present disclosure, an operating method of a processor of a storage device is provided. The operating method includes selecting a victim sub-block from among first sub-blocks and second sub-blocks of a non-volatile memory. Each of the first sub-blocks has a first block size. Each of the second sub-blocks has a second block size. The second block size is different from the first block size. The operating method further includes copying a valid page of the victim sub-block to a target sub-block, and performing an erase operation on the victim sub-block. The selecting of the victim sub-block includes at least one of selecting, as the victim sub-block, a sub-block having a smallest ratio value of a valid page count to an invalid page count from among the first sub-blocks and the second sub-blocks; selecting, as the victim sub-block, a sub-block having a largest difference value between the invalid page count and the valid page count from among the first sub-blocks and the second sub-blocks; and selecting, as the victim sub-block, a sub-block having a smallest ratio value of the valid page count to a block size from among the first sub-blocks and the second sub-blocks.

According to an aspect of the present disclosure, an operating method of a processor of a storage device is provided. The operating method includes performing a first garbage collection operation on first sub-blocks of a non-volatile memory, and performing a second garbage collection operation on second sub-blocks of the non-volatile memory. Each of the first sub-blocks has a first block size. Each of the second sub-blocks has a second block size. The second block size is different from the first block size. The performing of the first garbage collection operation includes selecting, as a first victim sub-block, a sub-block with a lowest valid page count from among the first sub-blocks, copying a valid page of the first victim sub-block to a first target sub-block from among the first sub-blocks, and performing a first erase operation on the first victim sub-block. The performing of the second garbage collection operation includes selecting a second victim sub-block from among the second sub-blocks, copying a valid page of the second victim sub-block to a second target sub-block from among the second sub-blocks, and performing a second erase operation on the second victim sub-block.

Additional aspects will be set forth in part in the description which follows and, in part, will be apparent from the description, or may be learned by practice of the presented embodiments.

BRIEF DESCRIPTION OF DRAWINGS

The above and other aspects, features, and advantages of certain embodiments of the present disclosure will be more apparent from the following detailed description taken in conjunction with the accompanying drawings in which:

FIG. 11B illustrates a garbage collection management table, according to an embodiment;

FIG. 12B illustrates a garbage collection management table, according to an embodiment;

FIG. 13B illustrates a garbage collection management table, according to an embodiment;

FIG. 14B illustrates a garbage collection management table, according to an embodiment;

FIG. 19B illustrates first and second garbage collection management tables, according to an embodiment;

FIG. 20B illustrates first and second garbage collection management tables, according to an embodiment;

DETAILED DESCRIPTION

Figure 1:
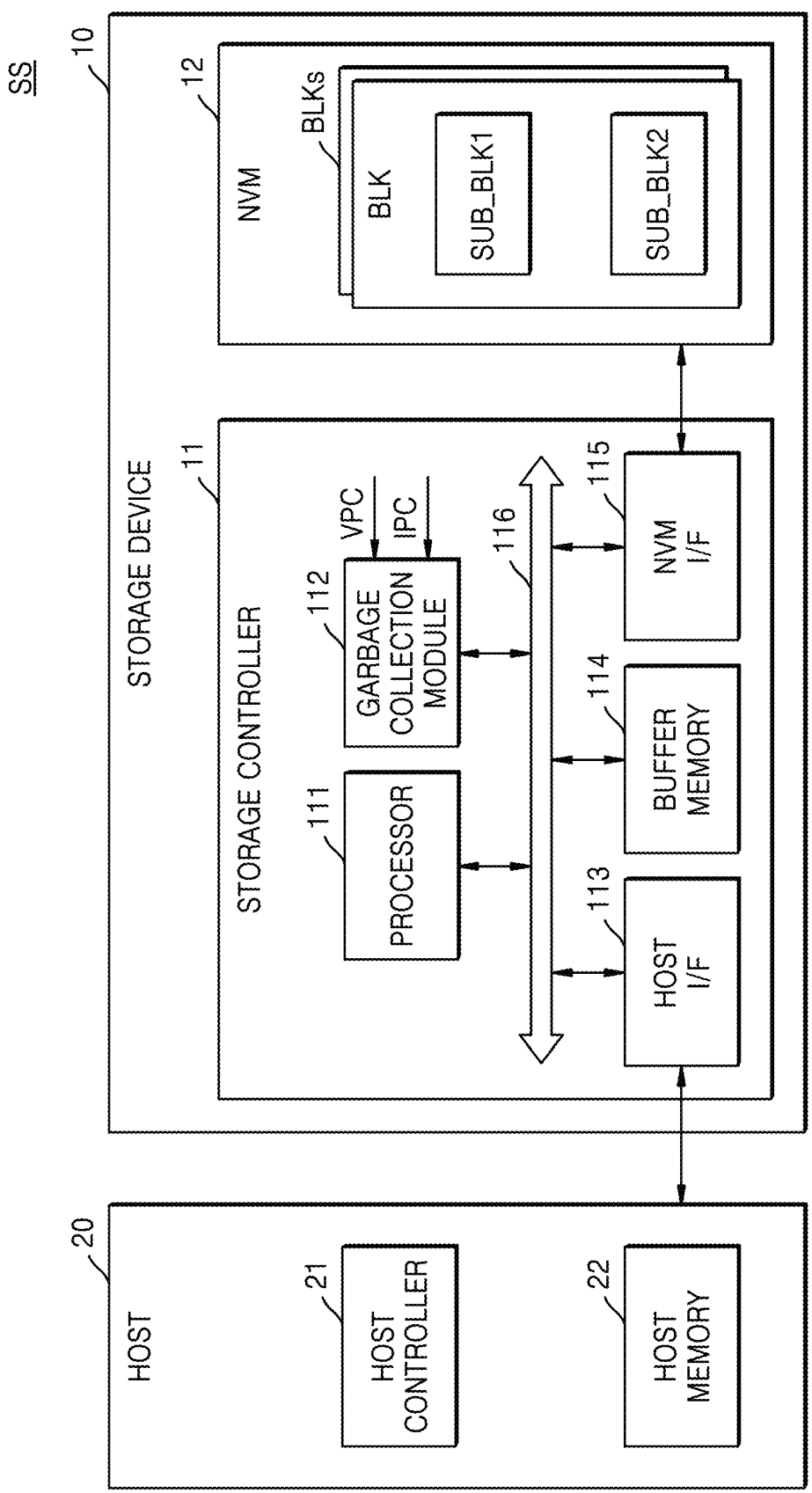
FIG. 1 is a block diagram of a storage system, according to an embodiment.

The following description with reference to the accompanying drawings is provided to assist in a comprehensive understanding of embodiments of the present disclosure defined by the claims and their equivalents. Various specific details are included to assist in understanding, but these details are considered to be exemplary only. Therefore, those of ordinary skill in the art will recognize that various changes and modifications of the embodiments described herein can be made without departing from the scope and spirit of the disclosure. In addition, descriptions of well-known functions and structures are omitted for clarity and conciseness.

With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

It will be understood that when an element or layer is referred to as being "over," "above," "on," "below," "under," "beneath," "connected to" or "coupled to" another element or layer, it can be directly over, above, on, below, under, beneath, connected or coupled to the other element or layer or intervening elements or layers may be present. In contrast, when an element is referred to as being "directly over," "directly above," "directly on," "directly below," "directly under," "directly beneath," "directly connected to" or "directly coupled to" another element or layer, there are no intervening elements or layers present.

The terms "upper," "middle", "lower", etc. may be replaced with terms, such as "first," "second," third" to be used to describe relative positions of elements. The terms "first," "second," third" may be used to described various elements but the elements are not limited by the terms and a "first element" may be referred to as a "second element". Alternatively or additionally, the terms "first", "second", "third", etc. may be used to distinguish components from each other and do not limit the present disclosure. For example, the terms "first", "second", "third", etc. may not necessarily involve an order or a numerical meaning of any form.

Reference throughout the present disclosure to "one embodiment," "an embodiment," "an example embodiment," or similar language may indicate that a particular feature, structure, or characteristic described in connection with the indicated embodiment is included in at least one embodiment of the present solution. Thus, the phrases "in one embodiment", "in an embodiment," "in an example embodiment," and similar language throughout this disclosure may, but do not necessarily, all refer to the same embodiment.

It is understood that the specific order or hierarchy of blocks in the processes/flowcharts disclosed are an illustration of exemplary approaches. Based upon design preferences, it is understood that the specific order or hierarchy of blocks in the processes/flowcharts may be rearranged. Further, some blocks may be combined or omitted. The accompanying claims present elements of the various blocks in a sample order, and are not meant to be limited to the specific order or hierarchy presented.

Hereinafter, embodiments are described in detail with reference to the accompanying drawings.

FIG. 1 is a block diagram of a host-storage system SS, according to an embodiment. Referring to FIG. 1, the host-storage system SS may include a storage device 10 and a host 20. The storage device 10 may include a storage controller 11 and a non-volatile memory (NVM) 12. The NVM 12 may include a plurality of blocks BLKs, and each block BLK may include a plurality of sub-blocks (e.g., SUB_BLK1, SUB_BLK2) having different block sizes. In an embodiment, the block size may correspond to the number of word lines connected to each sub-block. Alternatively or additionally, the block size may correspond to the total number of pages included in each sub-block, wherein a page may correspond to a unit of program and read.

In an embodiment, an erase operation on the NVM 12 may be performed in units of blocks and/or sub-blocks. For example, in a first mode, an erase operation may be independently performed on each of the plurality of sub-blocks. That is, in the first mode, the erase operation may be performed in units of sub-blocks. In a second mode, an erase operation may be independently performed on each of the plurality of blocks BLKs. That is, in the second mode, the erase operation may be performed in units of blocks.

In an embodiment, each block BLK may include a first sub-block SUB_BLK1 having a first block size and a second sub-block SUB_BLK2 having a second block size. The first block size and the second block size may be different from each other. For example, the first sub-block SUB_BLK1 may be connected to M word lines, and the second sub-block SUB_BLK2 may be connected to N word lines, where M and N may be different positive integers (e.g., greater than zero). However, the present disclosure is not limited thereto. For example, each block BLK may include three or more sub-blocks. As such, each block BLK may have a multi-sub-block structure.

The storage controller 11 may communicate with the NVM 12, and may control a garbage collection operation on the plurality of sub-blocks of the NVM 12. That is, the storage controller 11 may select a victim sub-block from among the plurality of sub-blocks of the NVM 12, copy valid data of the victim sub-block to a new sub-block (e.g., a target sub-block), and secure usable capacity in the NVM 12 by performing a garbage collection operation to erase the victim sub-block. Hereinafter, an exemplary configuration and operation of the storage controller 11 are described in further detail.

The storage controller 11 may include a processor 111, a garbage collection module 112, a host interface 113, a buffer memory 114, and an NVM interface 115, which may communicate with each other through a bus 116. The processor 111 may include a central processing unit (CPU) or a microprocessor, and may control the overall operation of the storage controller 11. In an embodiment, the processor 111 may be implemented as a multi-core processor, for example, as a dual-core processor and/or a quad-core processor. The buffer memory 114 may temporarily store data to be written to the NVM 12 and/or data to be read from the NVM 12. The buffer memory 114 may be provided in the storage controller 11, and/or may be arranged outside the storage controller 11. For example, the storage controller 11 may further include a buffer memory manager (not shown) or a buffer memory interface (not shown) for communicating with the buffer memory 114.

In an embodiment, the garbage collection module 112 may select a victim sub-block from among a plurality of sub-blocks based on an operation result of at least two of the number of valid pages (hereinafter referred to as a valid page count (VPC)), the number of invalid pages (hereinafter referred to as an invalid page count (IPC)), and a block size for each of the plurality of sub-blocks. The garbage collection module 112 may copy a valid page of the victim sub-block to a target sub-block from among the plurality of sub-blocks. Alternatively or additionally, the garbage collection module 112 may control a garbage collection operation on the plurality of sub-blocks by referring to a garbage collection management table, and may update the garbage collection management table (e.g., GTB of FIG. 8) and a mapping table (e.g., MTB of FIG. 8), according to a result of performing the garbage collection operation. The garbage collection operation is described in further detail below with reference to FIGS. 8 to 15.

In an embodiment, the garbage collection module 112 may group sub-blocks having the same size, and may independently control a garbage collection operation for each group. For example, the garbage collection module 112 may manage a garbage collection management table for each group, may control a garbage collection operation on sub-blocks included in a group by referring to a garbage collection management table corresponding to the group, and may update the garbage collection management table and a mapping table for each group, according to a result of performing the garbage collection operation for each group. The garbage collection operation performed in units of sub-block groups is described in further detail below with reference to FIGS. 16 to 21.

According to some embodiments, the garbage collection module 112 may be implemented in software, firmware, and/or hardware. In an embodiment, the garbage collection module 112 may be implemented in software, the storage controller 11 may further include a working memory into which the garbage collection module 112 is loaded, and a garbage collection operation on the NVM 12 may be controlled by the processor 111 executing the garbage collection module 112. For example, the working memory may be implemented as a volatile memory, such as but not limited to, static random-access memory (SRAM) and dynamic RAM (DRAM), or a non-volatile memory, such as but not limited to, flash memory and phase-change RAM (PRAM).

In an embodiment, the garbage collection module 112 may be implemented in a flash translation layer (FTL), the storage controller 11 may further include a working memory into which the FTL is loaded, and a garbage collection operation on the NVM 12 may be controlled by the processor 111 executing the FTL. For example, when the processor 111 executes the FTL, data writing operations and data reading operations on the NVM 12 may also be controlled. Alternatively or additionally, the FTL may perform various functions, such as but not limited to, address mapping and wear-leveling. The address mapping may refer to an operation of changing a logical address received from the host 20 into a physical address used to actually store data in the NVM 12. The wear-leveling may refer to a technique for preventing excessive degradation of a specific block by allowing the blocks BLKs in the NVM 12 to be uniformly used, and may be implemented through, for example, a firmware technique for balancing erase counts of physical blocks. However, the present disclosure is not limited in this regard.

The host interface 113 may transmit and/or receive packets to and/or from the host 20. A packet transmitted from the host 20 to the host interface 113 may include, but not be limited to, a command and/or data to be written to the NVM 12, and the like. Alternatively or additionally, a packet transmitted from the host interface 113 to the host 20 may include, but not be limited to, a response to a command and/or data read from the NVM 12, and the like. The NVM interface 115 may transmit data to be written to the NVM 12 and/or may receive data read from the NVM 12. In an embodiment, the NVM interface 115 may be implemented to comply with one or more standard storage communication protocols, such as, but not limited to, Non-Volatile Memory Express (NVMe), Universal Flash Storage (UFS), Embedded Multi-Media Card (eMMC), Peripheral Component Interconnect (PCI), PCI Express (PCIe), NVMe over Fabrics, Toggle, and Open NAND Flash Interface (ONFI).

The storage device 10 may include storage media for storing data according to a request from the host 20. For example, the storage device 10 may include, but not be limited to, at least one of a solid state drive (SSD), an embedded memory, and a detachable external memory. When the storage device 10 includes an SSD, the storage device 10 may conform to an NVMe standard. When the storage device 10 is an embedded memory or an external memory, the storage device 10 may conform to an UFS standard and/or an eMMC standard. That is, the host 20 and the storage device 10 may each generate a packet according to an adopted standard protocol and transmit and/or receive the generated packet.

In an embodiment, the host 20 may include a host controller 21 and a host memory 22. The host controller 21 may manage (e.g., control) an operation of storing data of a buffer area of the host memory 22 in the NVM 12 and/or storing data of the NVM 12 in the buffer area. That is, the host memory 22 may function as a buffer memory for temporarily storing data to be transmitted to the storage device 10 and/or data received from the storage device 10. For example, the host controller 21 may be one of a plurality of modules included in an application processor, and the application processor may be implemented as a system-on-chip (SoC). Alternatively or additionally, the host memory 22 may include an embedded memory provided in the application processor, and/or may include a non-volatile memory or a memory module arranged outside the application processor.

The number and arrangement of components of the host-storage system SS shown in FIG. 1 are provided as an example. In practice, there may be additional components, fewer components, different components, or differently arranged components than those shown in FIG. 1. Furthermore, two or more components shown in FIG. 1 may be implemented within a single component, or a single component shown in FIG. 1 may be implemented as multiple, distributed components. Alternatively or additionally, a set of (one or more) components shown in FIG. 1 may be integrated with each other and implemented as an integrated circuit, software, and/or a combination of circuits and software.

Figure 2:
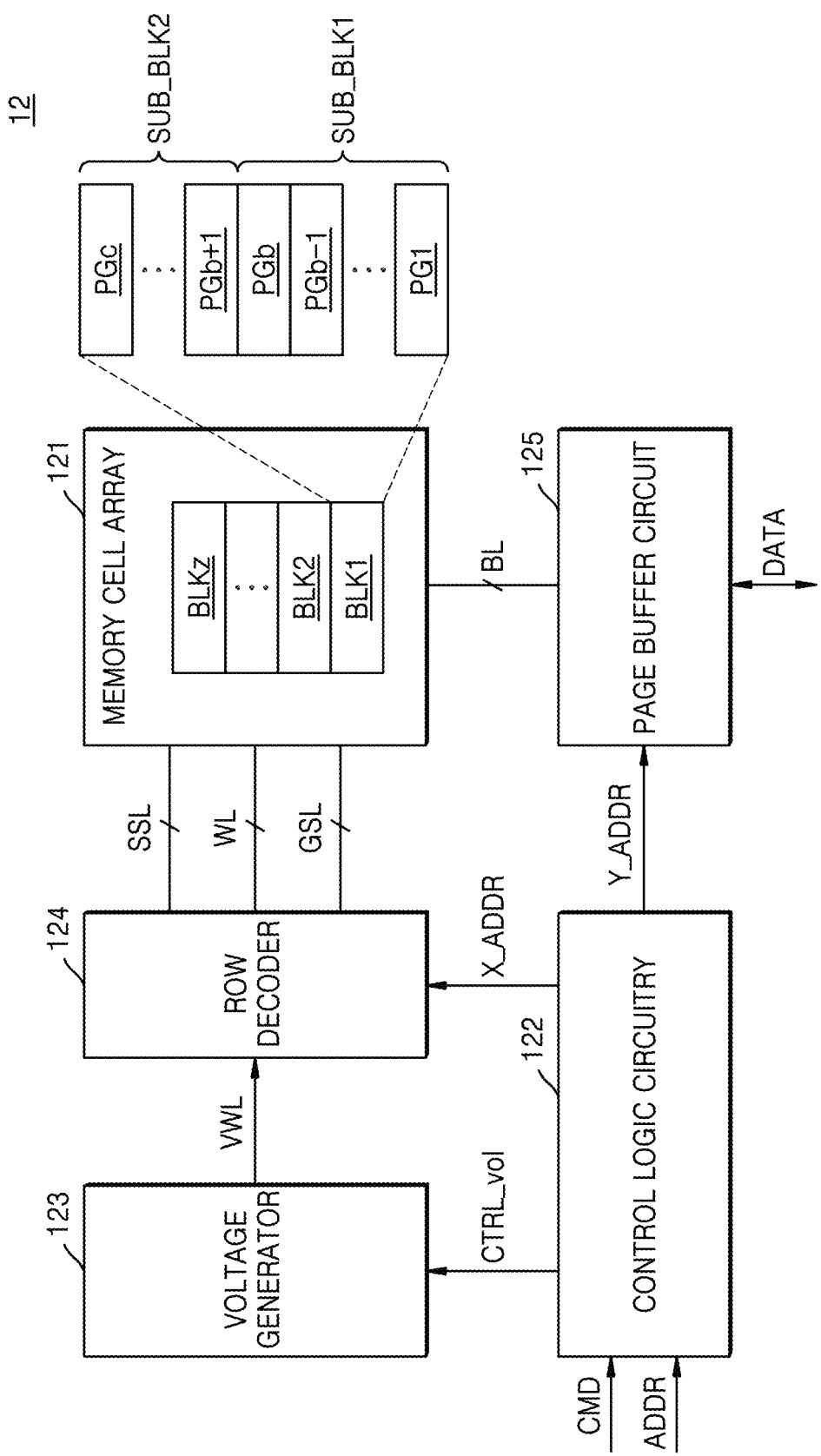
FIG. 2 is a block diagram of a non-volatile memory, according to an embodiment.

FIG. 2 is a block diagram of an NVM 12, according to an embodiment. Referring to FIG. 2, the NVM 12 may include a memory cell array 121, a control logic circuitry 122, a voltage generator 123, a row decoder 124, and a page buffer circuit 125. The NVM 12 may correspond to an implementation example of the NVM 12 of FIG. 1. That is, the NVM 12 of FIG. 2 may include or may be similar in many respects to the NVM 12 of FIG. 1, and may include additional features not mentioned above.

The memory cell array 121 may include a plurality of memory blocks BLK1 to BLKz, and each of the plurality of memory blocks BLK1 to BLKz may include a plurality of pages PG1 to PGc, where z, b, and c may be positive integers (e.g., greater than zero). Alternatively or additionally, the values of z and/or c (e.g., the quantities of memory blocks and/or pages in each memory block) may be variously changed according to some embodiments without deviating from the scope of the present disclosure. For example, a first portion of pages (e.g., PG1 to PGb) from among the plurality of pages PG1 to PGc may be included in a first sub-block SUB_BLK1, and the remaining pages (e.g., PGb+1 to PGc) from among the plurality of pages PG1 to PGc may be included in the second sub-block SUB_BLK2. In an embodiment, a memory block and/or a sub-block may be a unit of an erase operation, and/or a page may be a unit of a program operation and/or a read operation. The memory cell array 121 may be connected (e.g., coupled) to the page buffer circuit 125 through bit lines BL, and/or may be connected (e.g., coupled) to the row decoder 124 through word lines WL, string select lines SSL, and ground select lines GSL.

In an embodiment, the memory cell array 121 may include a three-dimensional (3D) memory cell array, and the 3D memory cell array may include a plurality of NAND strings. Each NAND string may include memory cells respectively connected to word lines stacked vertically on a substrate. The disclosures of U.S. Pat. Nos. 7,679,133, 8,553,466, 8,654,587, 8,559,235, and 9,536,970 are incorporated by reference herein in their entireties.

In an embodiment, the memory cell array 121 may include a flash memory, and the flash memory may include a two-dimensional (2D) NAND memory array and/or a 3D (or vertical) NAND (VNAND) memory array. In an embodiment, the memory cell array 121 may include other various types of non-volatile memories. For example, the memory cell array 121 may include, but not be limited to, magnetic RAM (MRAM), spin-transfer torque RAM (SP-RAM), conductive bridging RAM (CBRAM), ferroelectric RAM (FeRAM), PRAM, resistive RAM (RRAM), and other various types of memories.

The control logic circuitry 122 may generally control various operations in the NVM 12. For example, the control logic circuitry 122 may output various control signals in response to a command CMD and/or an address ADDR. In an embodiment, the control logic circuitry 122 may output a voltage control signal CTRL_vol, a row address X_ADDR, and a column address Y_ADDR. The voltage generator 123 may generate various types of voltages for performing program, read, and/or erase operations, based on the voltage control signal CTRL_vol. For example, the voltage generator 123 may generate a program voltage, a read voltage, a program verify voltage, an erase voltage, and the like, as a word line voltage VWL.

In response to the row address X_ADDR, the row decoder 124 may select one of the plurality of word lines WL, and/or may select one of the plurality of string select lines SSL. For example, the row decoder 124 may apply a program voltage and a program verify voltage to a selected word line during a program operation. Alternatively or additionally, the row decoder 124 may apply a read voltage to the selected word line during a read operation. The page buffer circuit 125 may select at least one bit line from among the bit lines BL in response to the column address Y_ADDR. The page buffer circuit 125 may operate as a write driver and/or a sense amplifier according to an operation mode.

Figure 3:
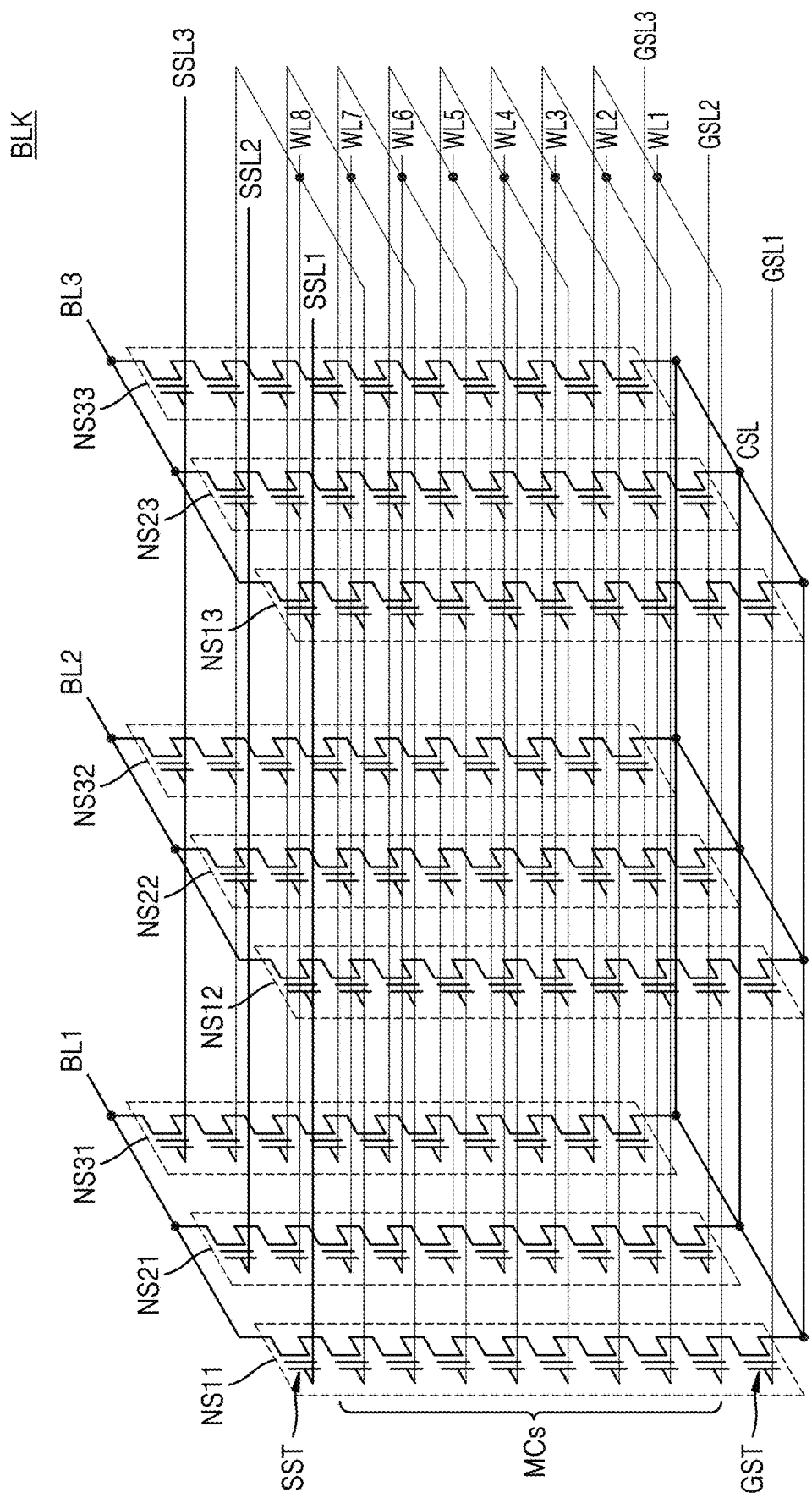
FIG. 3 is a circuit diagram of a memory block, according to an embodiment.

FIG. 3 is a circuit diagram of a memory block BLK, according to an embodiment. Referring to FIG. 3, the memory block BLK may correspond to one of the plurality of memory blocks BLK1 to BLKz of FIG. 2. That is, the memory block BLK of FIG. 3 may include or may be similar in many respects to at least one of the plurality of memory blocks BLK1 to BLKz of FIG. 2, and may include additional features not mentioned above.

The memory block BLK may include NAND strings NS11 to NS33, and each NAND string (e.g., NS11) may include a string select transistor SST, a plurality of memory cells MCs, and a ground select transistor GST, which may be connected (e.g., coupled) in series. The string select transistor SST, the ground select transistor GST, and the memory cells MCs included in each NAND string may form a stacked structure on a substrate in a vertical direction (e.g., an orthogonal direction with respect to a plane of the substrate surface).

In an embodiment, bit lines(e.g., first to third bit lines BL1 to BL3) may extend in a first direction, and word lines (e.g., WL1 to WL8) may extend in a second direction. The NAND strings NS11, NS21, and NS31 may be between the first bit line BL1 and a common source line CSL. The NAND strings NS12, NS22, and NS32 may be between the second bit line BL2 and the common source line CSL. The NAND strings NS13, NS23, and NS33 may be between the third bit line BL3 and the common source line CSL.

The string select transistor SST may be connected to string select lines SSL1 to SSL3 corresponding thereto. The memory cells MCs may be respectively connected to the word lines WL1 to WL8 corresponding thereto. The ground select transistor GST may be connected to ground select lines GSL1 to GSL3 corresponding thereto. The string select transistor SST may be connected to a corresponding bit line, and the ground select transistor GST may be connected to the common source line CSL. It is to be understood that the number of NAND strings, the number of word lines, the number of bit lines, the number of ground select lines, and the number of string select lines may be variously changed according to some embodiments without departing from the scope of the present disclosure.

Figure 4A:
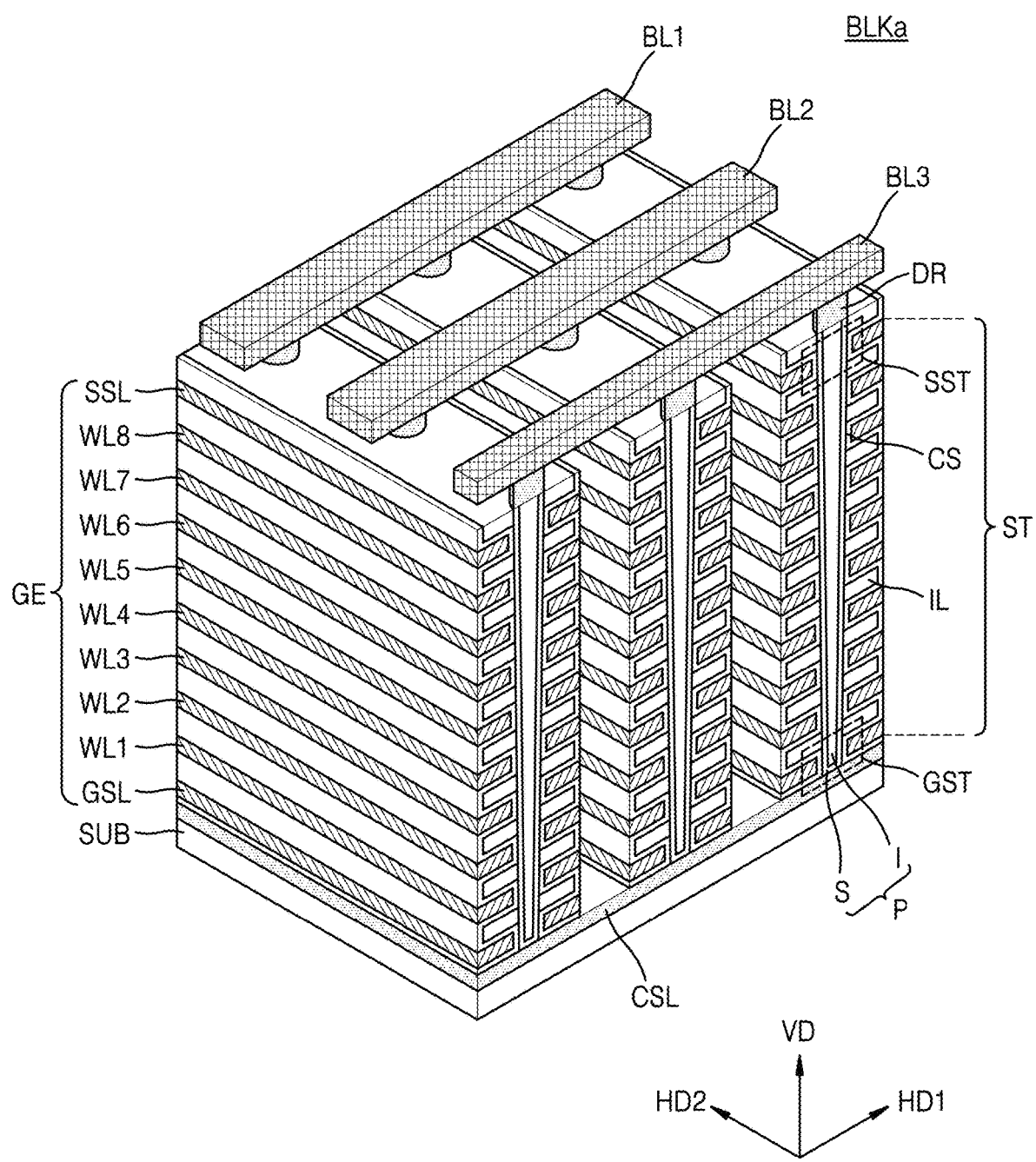
FIGS. 4A and 4B are perspective views of memory blocks, according to some embodiments.

FIG. 4A is a perspective view of a memory block BLKa, according to an embodiment. Referring to FIG. 4A, the memory block BLKa may correspond to one of the plurality of memory blocks BLK1 to BLKz of FIG. 2. That is, the memory block BLKa of FIG. 4A may include or may be similar in many respects to at least one of the plurality of memory blocks BLK1 to BLKz of FIG. 2 and the memory block BLK of FIG. 3, and may include additional features not mentioned above.

As shown in FIG. 4A, the memory block BLKa may include a memory stack ST extending in a vertical direction VD on a substrate SUB. For example, the memory block BLKa may include a single memory stack ST between the substrate SUB and bit lines BL1 to BL3. Common source lines CSL may be arranged on the substrate SUB. Insulating layers IL extending in a second horizontal direction HD2 may be sequentially provided on the substrate SUB in the vertical direction VD, between two adjacent common source lines CSL. In an embodiment, the insulating layers IL may be apart from each other by a certain distance in the vertical direction VD. Pillars P passing through the insulating layers IL in the vertical direction VD may be provided on the substrate SUB between two adjacent common source lines CSL. A surface layer S of each pillar P may include a first-type silicon material, and may function as a channel region. An inner layer I of each pillar P may include an insulating material, such as but not limited to, silicon oxide or an air gap.

A charge storage layer CS may be provided between two adjacent common source lines CSL along the insulating layers IL, the pillars P, and an exposed surface of the substrate SUB. The charge storage layer CS may include a gate insulating layer, a charge trap layer, and a blocking insulating layer. For example, the charge storage layer CS may have an oxide-nitride-oxide (ONO) structure. Alternatively or additionally, a gate electrode GE, such as ground lines GSL, string select lines SSL, and word lines WL1 to WL8, may be provided on an exposed surface of the charge storage layer CS between two adjacent common source lines CSL. Drains DR may be respectively provided on the plurality of pillars P. The bit lines BL1 to BL3 extending in a first horizontal direction HD1 may be arranged apart from each other by a certain distance in the second horizontal direction HD2 and may be provided on the drains DR.

Figure 4B:
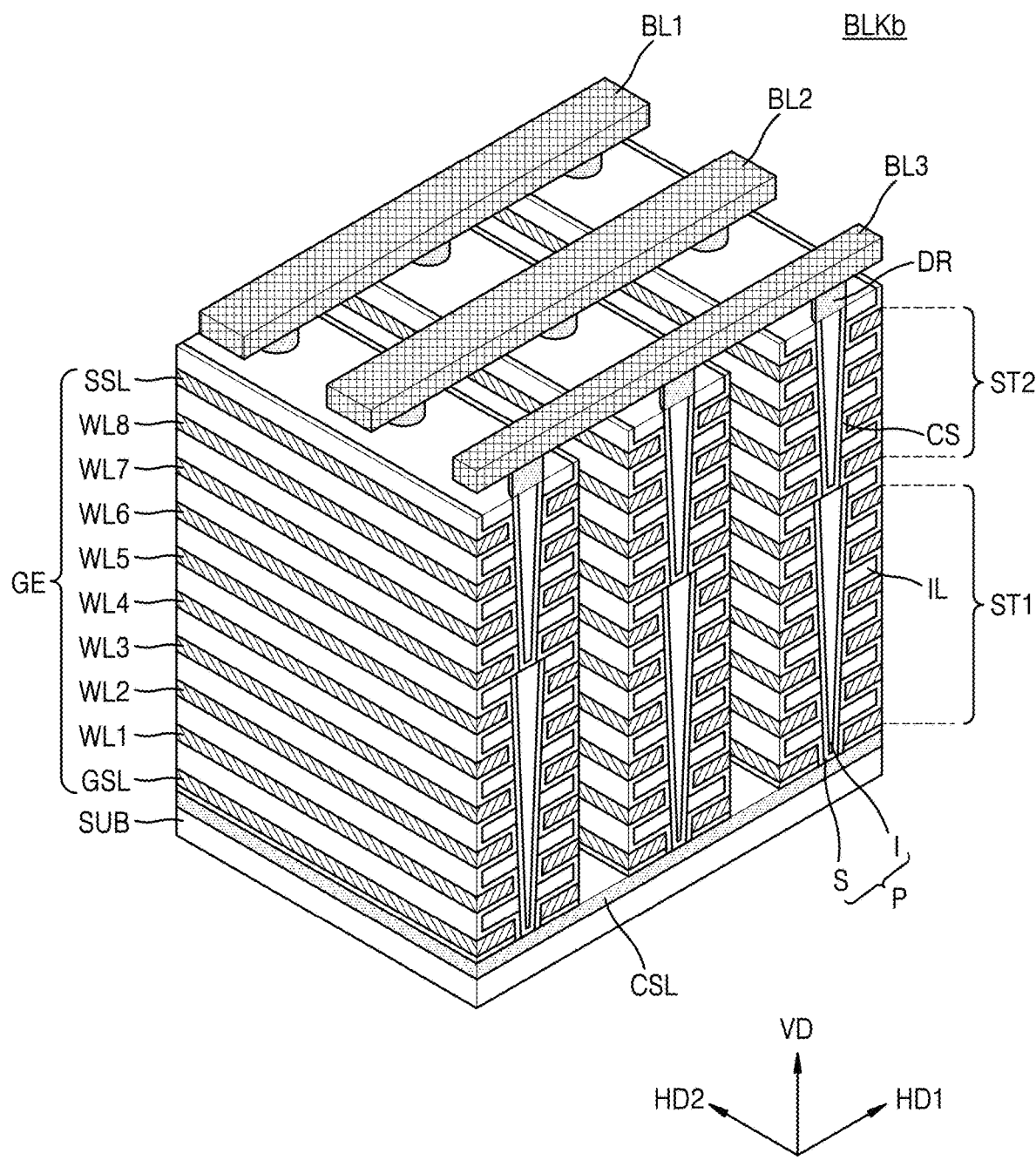

FIG. 4B is a perspective view of a memory block BLKb, according to an embodiment. Referring to FIG. 4B, the memory block BLKb may correspond to one of the plurality of memory blocks BLK1 to BLKz of FIG. 2. That is, the memory block BLKb of FIG. 4B may include or may be similar in many respects to at least one of the plurality of memory blocks BLK1 to BLKz of FIG. 2 and the memory block BLK of FIG. 3, and may include additional features not mentioned above. Alternatively or additionally, the memory block BLKb may correspond to a modified example of the memory block BLKa of FIG. 4A, and the descriptions provided above with reference to FIG. 4A may also be applied to the memory block BLKb of FIG. 4B.

The memory block BLKb may include a first memory stack ST1 and a second memory stack ST2 stacked on the substrate SUB in the vertical direction VD. For example, the memory block BLKb may include two memory stacks (e.g., the first memory stack ST1 and the second memory stack ST2) between the substrate SUB and the bit lines BL1 to BL3. That is, the memory block BLKb may have a multi-stack structure (e.g., a two-stack structure). However, the present disclosure is not limited thereto. For example, according to some embodiments, the memory block BLKb may include three or more memory stacks between the substrate SUB and the bit lines BL1 to BL3.

Figure 5:
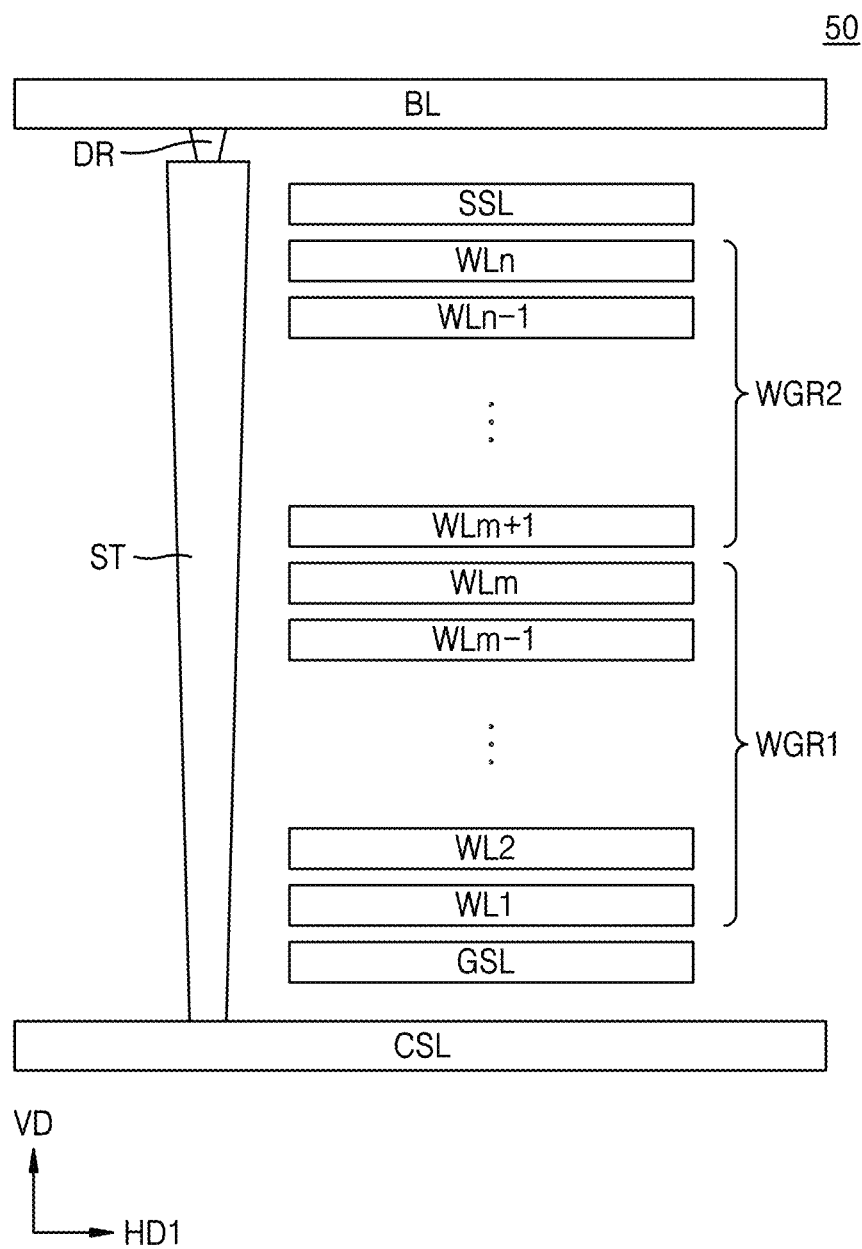
FIGS. 5 to 7 schematically illustrate non-volatile memories, according to some embodiments.

FIG. 5 schematically illustrates an NVM 50, according to an embodiment. Referring to FIG. 5, the NVM 50 may include a common source line CSL and a bit line BL extending in a first horizontal direction HD1. Alternatively or additionally, the NVM 50 may include a memory stack ST extending in a vertical direction VD. That is, the memory stack ST may be connected (e.g., coupled) to the bit line BL through a drain DR.

The NVM 50 may include or may be similar in many respects to at least one of the NVM 12 of FIG. 1 or 2, the memory block BLK of FIG. 3, and the memory block BLKa of FIG. 4A, and may include additional features not mentioned above. Furthermore, the memory stack ST of FIG. 5 may include or may be similar in many respects to at least one of the pillar P of FIG. 4A and the NAND string NS11 of FIG. 3, and may include additional features not mentioned above.

The NVM 50 may further include a plurality of word lines WL1 to WLn stacked in the vertical direction VD, at least one ground select line GSL may be arranged between the common source line CSL and the word line WL1, and at least one string select line SSL may be arranged between the bit line BL and the word line WLn. Alternatively or additionally, an erase control line (e.g., GIDL_SS, not shown) may be further arranged between the string select line SSL and the bit line BL, and an erase control line (e.g., GIDL_GS, not shown) may be further arranged between the ground select line GSL and the common source line CSL.

In an embodiment, the plurality of word lines WL1 to WLn may be grouped into a plurality of groups including a first word line group WGR1 and a second word line group WGR2. The first word line group WGR1 may include word lines that are relatively close to a substrate (e.g., WL1 to WLm), and the second word line group WGR2 may include word lines that are relatively far from the substrate (e.g., WLm+1 to WLn), where m may be a positive integer between 1 and n, and n may be a positive integer greater than 1. According to some embodiments, the plurality of word lines WL1 to WLn may be grouped into three or more groups.

In an embodiment, the number of word lines included in the first word line group WGR1 and the number of word lines included in the second word line group WGR2 may be different from each other. For example, the number of word lines included in the first word line group WGR1 may be greater than the number of word lines included in the second word line group WGR2. That is, m may be greater than n/2 (e.g., m>n/2). Alternatively or additionally, the number of word lines included in the first word line group WGR1 may be less than the number of word lines included in the second word line group WGR2 (e.g., m<n/2). For another example, the number of word lines included in the first word line group WGR1 may match the number of word lines included in the second word line group WGR2 (e.g., m=n/2).

In an embodiment, word lines included in the first word line group WGR1 may be connected to a first sub-block (e.g., SUB_BLK1 of FIG. 1), and word lines included in the second word line group WGR2 may be connected to a second sub-block (e.g., SUB_BLK2 of FIG. 1). That is, the block size of the first sub-block SUB_BLK1 may correspond to the number of word lines included in the first word line group WGR1, and the block size of the second sub-block SUB_BLK2 may correspond to the number of word lines included in the second word line group WGR2. As such, the first and second sub-blocks SUB_BLK1 and SUB_BLK2 may have different block sizes.

According to some embodiments, the sizes of the first word line WGR1 and the second word line group WGR2 may be dynamically changed. Accordingly, the block sizes of the first sub-block SUB_BLK1 and the second sub-block SUB_BLK2 may also be dynamically changed. That is, the block sizes of the first sub-block SUB_BLK1 and the second sub-block SUB_BLK2 may be changed during runtime of the storage device 10. For example, the storage controller 11 may perform an operation of selecting a victim sub-block considering the changed block sizes of the first sub-block SUB_BLK1 and the second sub-block SUB_BLK2.

Figure 6:
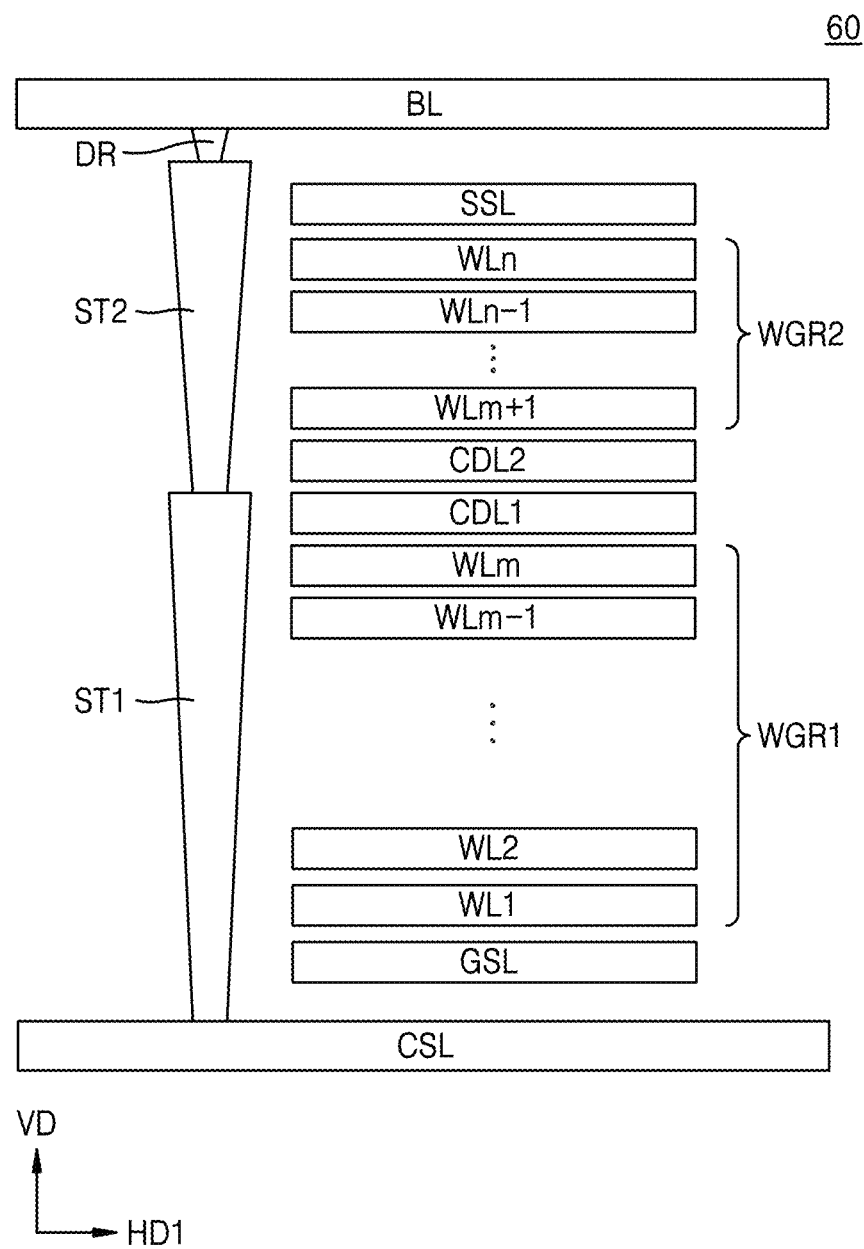

FIG. 6 schematically illustrates an NVM 60, according to an embodiment. Referring to FIG. 6, the NVM 60 may include a common source line CSL and a bit line BL extending in a first horizontal direction EED1, and may include a first memory stack ST1 and a second memory stack ST2 extending in a vertical direction VD. As shown in FIG. 6, the first memory stack ST1 may be arranged on the common source line CSL, and the second memory stack ST2 may be arranged on the first memory stack ST1 and connected to the bit line BL through a drain DR.

The NVM 60 may include or may be similar in many respects to at least one of the NVM 12 of FIG. 1 or 2, the memory block BLK of FIG. 3, and the memory block BLKb of FIG. 4B, and may include additional features not mentioned above. Furthermore, the first memory stack ST1 and the second memory stack ST2 may respectively correspond to the first memory stack ST1 and the second memory stack ST2 of FIG. 4B, and may include additional features not mentioned above. Alternatively or additionally, the NVM 60 may correspond to a modified example of the NVM 50 of FIG. 5, and redundant descriptions thereof are omitted.

The NVM 60 may further include first and second junction dummy word lines CDL1 and CDL2 corresponding to a junction between the first memory stack ST1 and the second memory stack ST2. However, the present disclosure is not limited thereto, and the number of junction dummy word lines corresponding to the junction may be variously changed according to some embodiments. Alternatively or additionally, according to some embodiments, a junction dummy word line may not be arranged.

In an embodiment, the plurality of word lines WL1 to WLn may be grouped into a plurality of word line groups including a first word line group WGR1 and a second word line group WGR2. The first word line group WGR1 may include word lines connected (e.g., coupled) to the first memory stack ST1, and the second word line group WGR2 may include word lines connected to the second memory stack ST2. However, the present disclosure is not limited thereto. For example, the word lines connected to the first memory stack ST1 may be grouped into a plurality of word line groups, and the word lines connected to the second memory stack ST2 may also be grouped into a plurality of word line groups.

Figure 7:
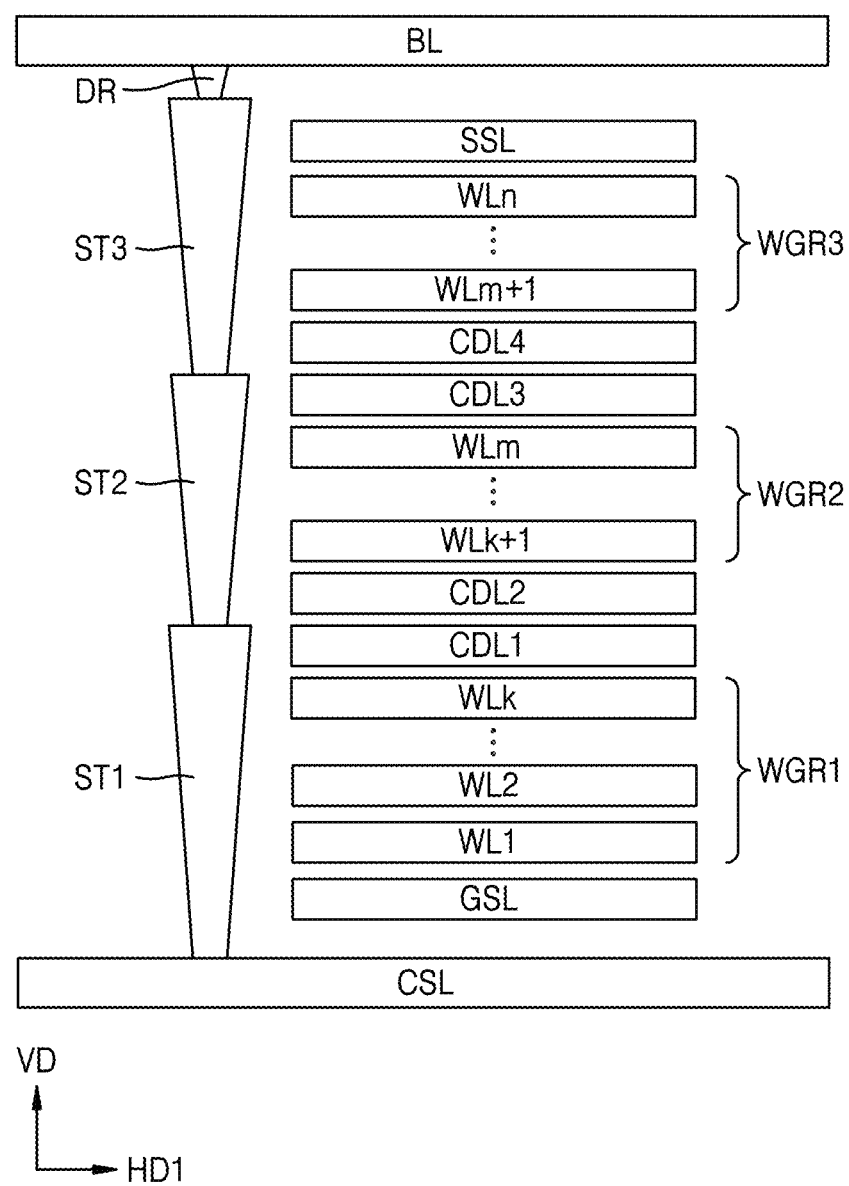

FIG. 7 schematically illustrates an NVM 70, according to an embodiment. Referring to FIG. 7, the NVM 70 may include a common source line CSL and a bit line BL extending in a first horizontal direction RD1. Alternatively or additionally, the NVM 70 may include a first memory stack ST1, a second memory stack ST2, and a third memory stack ST3 extending in a vertical direction VD. For example, the first memory stack ST1 may be arranged on the common source line CSL, the second memory stack ST2 may be arranged on the first memory stack ST1, and the third memory stack ST3 may be arranged on the second memory stack ST2 and connected to the bit line BL through a drain DR.

The NVM 70 may include or may be similar in many respects to at least one of the NVM 12 of FIG. 1 or 2, the memory block BLK of FIG. 3, and the memory block BLKb of FIG. 4B, and may include additional features not mentioned above. Alternatively or additionally, the NVM 70 may correspond to a modified example of the NVM 60 of FIG. 6, and redundant descriptions thereof are omitted.

The NVM 70 may further include first and second junction dummy word lines CDL1 and CDL2 corresponding to a junction between the first memory stack ST1 and the second memory stack ST2, and third and fourth junction dummy word lines CDL3 and CDL4 corresponding to a junction between the second memory stack ST2 and the third memory stack ST3.

In an embodiment, the plurality of word lines WL1 to WLn may be grouped into a plurality of word line groups including a first word line group WGR1, a second word line group WGR2, and a third word line group WGR3. The first word line group WGR1 may include word lines connected to the first memory stack ST1, the second word line group WGR2 may include word lines connected to the second memory stack ST2, and the third word line group WGR3 may include word lines connected to the third memory stack ST3. The first word line group WGR1 may include word lines that are relatively close to a substrate(e.g., WL1 to WLk), the second word line group WGR2 may include word lines that are farther from the substrate than the word lines of the first word line group WGR1 (e.g., WLk+1 to WLm), and the third word line group WGR3 may include word lines that are farther from the substrate than the word lines of the second word line group WGR2 (e.g., WLm+1 to WLn).

In an embodiment, at least two of the number of word lines included in the first word line group WGR1, the number of word lines included in the second word line group WGR2, and the number of word lines included in the third word line group WGR3 may be different from each other. For example, the number of word lines included in the first word line group WGR1 may be greater than the number of word lines included in the second word line group WGR2, and the number of word lines included in the second word line group WGR2 may be greater than the number of word lines included in the third word line group WGR3. In an embodiment, the first memory stack ST1 may correspond to the first sub-block SUB_BLK1, the second memory stack ST2 may correspond to the second sub-block SUB_BLK2, and the third memory stack ST3 may correspond to a third sub-block SUB_BLK3. As a result, the first sub-block SUB_BLK1, the second sub-block SUB_BLK2, and the third sub-block SUB_BLK3 may have different block sizes from each other.

In some embodiments, a memory device may include four or more memory stacks. As the number of memory stacks increases, the number of word line groups corresponding to a plurality of word lines may also increase, and the number of sub-blocks included in a memory block may also increase.

Figure 8:
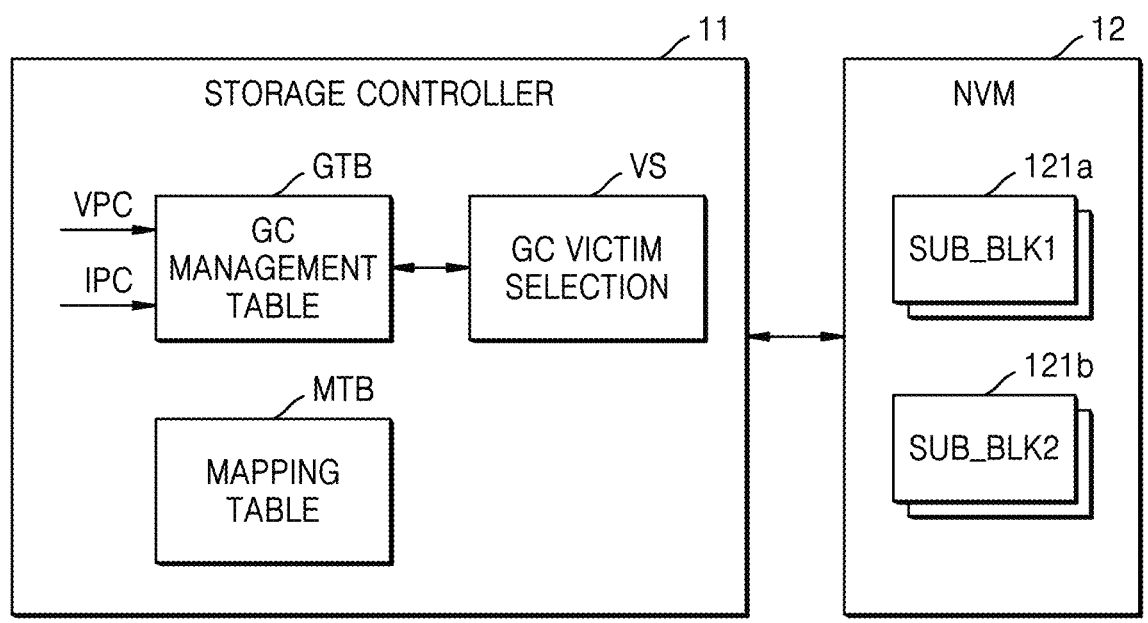
FIG. 8 is a block diagram of a storage device, according to an embodiment.

FIG. 8 is a block diagram of a storage device 80, according to an embodiment. Referring to FIG. 8, the storage device 80 may include a storage controller 11 and an NVM 12, and may correspond to an implementation example of the storage device 10 of FIG. 1. That is, the storage device 80 of FIG. 8 may include or may be similar in many respects to the storage device 10 described above with reference to FIG. 1, and may include additional features not mentioned above. Furthermore, the storage controller 11 and the NVM 12 of FIG. 8 may include or may be similar in many respects to their corresponding components described above with reference to FIG. 1, and may include additional features not mentioned above.

The NVM 12 may include a plurality of first sub-blocks 121a and a plurality of second sub-blocks 121b. Each of the plurality of first sub-blocks 121a may have a first block size, and may include a first plurality of memory cells. Each of the plurality of second sub-blocks 121b may have a second block size, and may include a second plurality of memory cells. As such, the first block size and the second block size may be different from each other. For example, each of the plurality of first sub-blocks 121a may be connected to the first word line group WGR1 of FIG. 5, 6, or 7, and each of the plurality of second sub-blocks 121b may be connected to the second word line group WGR2 of FIG. 5, 6, or 7.

The storage controller 11 may include a garbage collection management table GTB, a garbage collection victim selection component VS, and a mapping table MTB. For example, the garbage collection management table GTB and the garbage collection victim selection component VS may be included in the garbage collection module 112 of FIG. 1. In an embodiment, the garbage collection management table GTB, the garbage collection victim selection component VS, and/or the mapping table MTB may be loaded into a working memory. That is, the components of storage controller 11 of FIG. 8 may be integrated with each other and implemented as an integrated circuit, software, and/or a combination of circuits and software, as described above with reference to FIG. 1.

The garbage collection management table GTB may store the number of valid pages (e.g., a valid page count (VPC)) corresponding to each of the first sub-blocks 121a and the second sub-blocks 121b and the number of invalid pages (e.g., an invalid page count (IPC)) corresponding to each of the first sub-blocks 121a and the second sub-blocks 121b. In an embodiment, the storage controller 11 may receive read data from the NVM 12, and may calculate the valid page count VPC and the invalid page count IPC from the received read data. Alternatively or additionally, the NVM 12 may include a valid page counter and an invalid page counter, and the storage controller 11 may receive the valid page count VPC and the invalid page count IPC from the NVM 12. In an optional or additional embodiment, the NVM 12 may include a valid page counter, and the storage controller 11 may receive the valid page count VPC from the NVM 12 and calculate the invalid page count IPC based on the block size of each of the first sub-blocks 121a and the second sub-blocks 121b.

The garbage collection victim selection component VS may select a victim sub-block from among the plurality of first sub-blocks 121a and the plurality of second sub-blocks 121b by referring to the garbage collection management table GTB. In an embodiment, the garbage collection victim selection component VS may select a victim sub-block when a free block is requested. For example, when a ratio between the valid page count VPC and the invalid page count IPC is greater than or equal to a threshold value, the garbage collection victim selection component VS may be enabled to select a victim sub-block. In an embodiment, the garbage collection victim selection component VS may periodically select a victim sub-block. For example, the garbage collection victim selection component VS may be enabled, according to a predetermined selection period, to select a victim sub-block. That is, the selection period may be dynamically changed.

In an embodiment, when the first and second sub-blocks 121a and 121b have the same valid page count VPC, the garbage collection victim selection component VS may select a sub-block with the highest (e.g., largest) invalid page count IPC as the victim sub-block. In an embodiment, the garbage collection victim selection component VS may calculate a value obtained by subtracting the invalid page count IPC from the valid page count VPC for each of the first and second sub-blocks 121a and 121b, and may select a sub-block with the smallest value as the victim sub-block. Alternatively or additionally, the garbage collection victim selection component VS may calculate a value obtained by subtracting the valid page count VPC from the invalid page count IPC for each of the first and second sub-blocks 121a and 121b, and may select a sub-block with the greatest value as the victim sub-block.

In an embodiment, the garbage collection victim selection component VS may compare the valid page count VPC with a threshold value, and may select a sub-block according to the comparison result. For example, when the valid page count VPC is greater than or equal to the threshold value, a sub-block with the lowest (e.g., smallest) valid page count VPC from among the first and second sub-blocks 121a and 121b may be selected as the victim sub-block. Alternatively or additionally, when the valid page count VPC is less than the threshold value, a sub-block with the highest (e.g., largest) invalid page count IPC from among the first and second sub-blocks 121a and 121b may be selected as the victim sub-block.

In an embodiment, the threshold value may change according to a program time, a read time, and an erase time. That is, a page migration time may correspond to the sum of the program time, the read time, and the erase time, and the threshold value may change depending on the page migration time. Alternatively or additionally, the threshold value may be changed according to a degree of wear of a sub-block, for example, a program/erase cycle count.

In an embodiment, the garbage collection victim selection component VS may perform an operation of selecting a victim sub-block by further considering a selection weight. In an optional or additional embodiment, the selection weight may include a program time, a read time, and/or an erase time. That is, a page migration time may correspond to the sum of the program time, the read time, and the erase time. The garbage collection victim selection component VS may perform an operation of selecting a victim sub-block considering the page migration time. In an optional or additional embodiment, the selection weight may include a degree of wear of a sub-block, for example, a program/erase cycle count.

The mapping table MTB may store physical addresses of the NVM 12 respectively corresponding to logical addresses received from the host 20. The storage controller 11 may update the garbage collection management table GTB and/or the mapping table MTB when a garbage collection operation is performed. For example, the storage controller 11 may update the garbage collection management table GTB and/or the mapping table MTB when an operation of copying or writing valid data of a victim sub-block to a target sub-block during the garbage collection operation has been completed.

Alternatively or additionally, the storage controller 11 may further include a free block table, and may manage the free block table according to a result of performing the garbage collection operation. For example, the storage controller 11 may update information on the victim sub-block in the free block table when an erase operation on the victim sub-block is completed during the garbage collection operation. In an embodiment, the free block table may be implemented as part of the mapping table MTB. In an embodiment, the storage controller 11 may periodically (e.g., based on a time period) or non-periodically (e.g., based on occurrence of an event) update the free block table.

An operating method of the storage controller 11, according to an embodiment, may correspond to a garbage collection operating method of the storage controller 11. The operating method may include selecting a victim sub-block from among the first sub-blocks 121a and the second sub-blocks 121b, copying a valid page of the victim sub-block to a target sub-block from among a plurality of sub-blocks, and performing an erase operation on the victim sub-block. For example, the selecting of the victim sub-block may include at least one of selecting a sub-block with the smallest ratio value of the valid page count VPC to the invalid page count IPC from among the first sub-blocks 121a and the second sub-blocks 121b as the victim sub-block, selecting a sub-block with the greatest difference value between the invalid page count IPC and the valid page count VPC from among the first sub-blocks 121a and the second sub-blocks 121b as the victim sub-block, and selecting a sub-block with the smallest ratio value of the valid page count VPC to a block size from among the first sub-blocks 121a and the second sub-blocks 121b as the victim sub-block.

Figure 9:
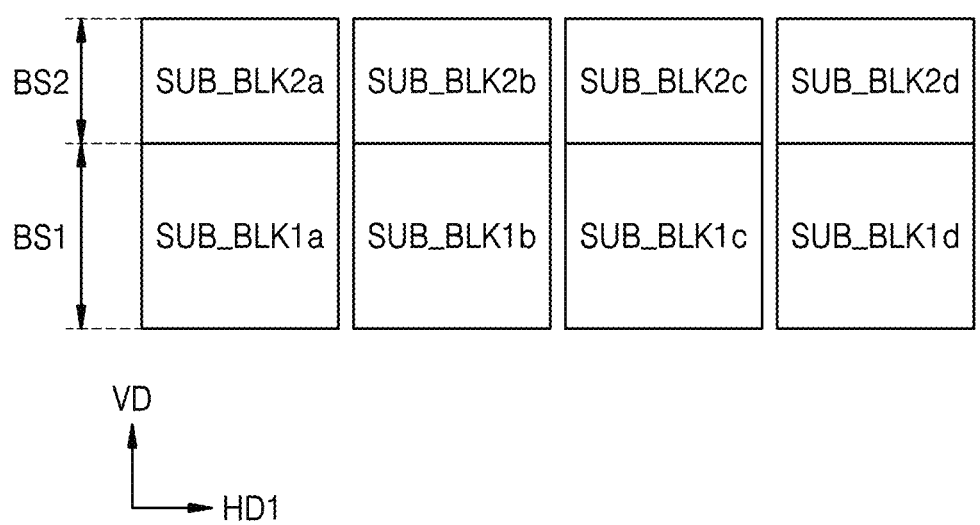
FIG. 9 illustrates a non-volatile memory including sub-blocks having different block sizes, according to an embodiment.

FIG. 9 illustrates an NVM 90 including sub-blocks having different block sizes, according to an embodiment. Referring to FIG. 9, the NVM 90 may include first sub-blocks SUB_BLK1a to SUB_BLK1d and second sub-blocks SUB_BLK2a to SUB_BLK2d. For example, the NVM 90 may correspond to an example of the NVM 12 of FIG. 8, the first sub-blocks SUB_BLK1a to SUB_BLK1d may correspond to the first sub-blocks 121a of FIG. 8, and the second sub-blocks SUB_BLK2a to SUB_BLK2d may correspond to the second sub-blocks 121b of FIG. 8.

For example, the first sub-blocks SUB_BLK1a to SUB_BLK1d may be adjacent to each other in a first direction HD1, and the second sub-blocks SUB_BLK2a to SUB_BLK2d may be adjacent to each other in the first direction HD1. However, the present disclosure is not limited thereto. Alternatively or additionally, the first sub-block SUB_BLK1a and the second sub-block SUB_BLK2a adjacent to each other in a vertical direction VD may constitute a memory block and/or block BLK. Each of the first sub-blocks SUB_BLK1a to SUB_BLK1d may have a first block size BS1 in the vertical direction VD, and each of the second sub-blocks SUB_BLK2a to SUB_BLK2d may have a second block size BS2 in the vertical direction VD. In an embodiment, the first block size BS1 and the second block size BS2 may be different from each other.

Figure 10:
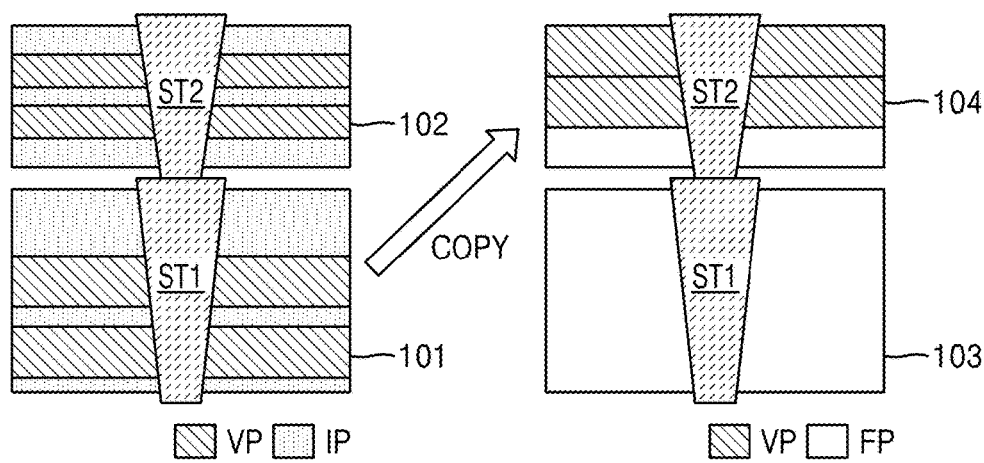
FIG. 10 illustrates a garbage collection operation of a storage controller of FIG. 8, according to an embodiment.
Figure 10:
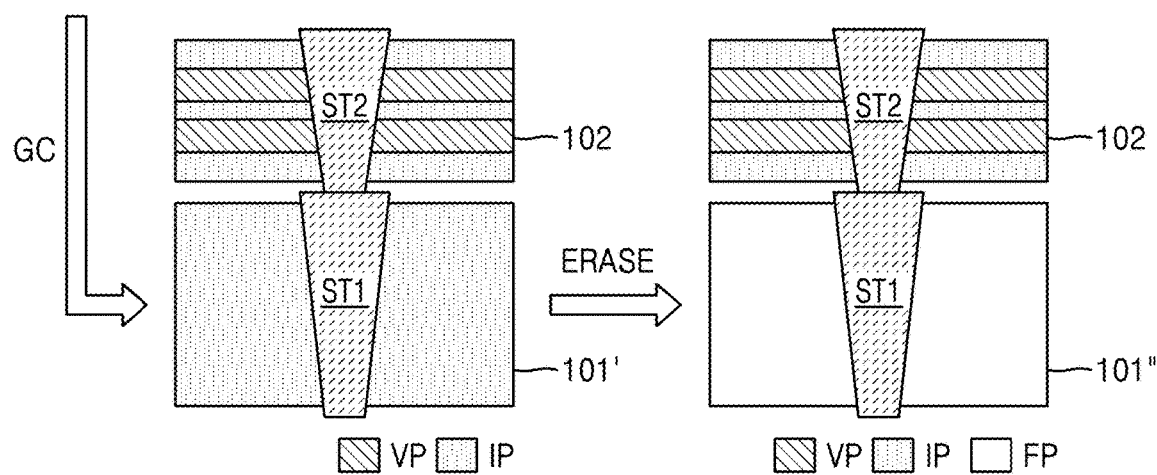

FIG. 10 illustrates a garbage collection operation of the storage controller 11 of FIG. 8, according to an embodiment. Referring to FIG. 10, first sub-block 101 and second sub-block 102 may be stacked in a vertical direction. For example, the first sub-block 101 and the second sub-block 102 may correspond to the first sub-block SUB_BLK1a and the second sub-block SUB_BLK2a of FIG. 9, respectively. Third sub-block 103 and fourth sub-block 104 may be stacked in the vertical direction. For example, the third sub-block 103 and the fourth sub-block 104 may correspond to the first sub-block SUB_BLK1b and the second sub-block SUB_BLK2b of FIG. 9, respectively. In an embodiment, the first sub-block 101 and the third sub-block 103 may correspond to a first memory stack ST1. Alternatively or additionally, the second sub-block 102 and the fourth sub-block 104 may correspond to a second memory stack ST2.

The first sub-block 101 and the second sub-block 102 may include valid pages VP and invalid pages IP. As described above, the valid pages VP may refer to pages in which valid data is written, and the invalid pages IP may refer to pages in which invalid data is written. Alternatively or additionally, the first sub-block 101 and the second sub-block 102 may further include a free page in which data is not written. For example, the number of word lines connected to the first sub-block 101 and the third sub-block 103 may be 100, and the number of word lines connected to the second sub-block 102 and the fourth sub-block 104 may be 80. In such an example, the block size of a sub-block corresponding to the first memory stack ST1 may be greater than the block size of a sub-block corresponding to the second memory stack ST2.

According to some embodiments, the storage controller 11 may select a victim sub-block from among the first sub-block 101 and the second sub-block 102, based on an operation result of at least two of the valid page count VPC, the invalid page count IPC, and a block size corresponding to the first sub-block 101 and the second sub-block 102. In an optional or additional embodiment, the storage controller 11 may select the victim sub-block based on a difference between the valid page count VPC and the invalid page count IPC. Detailed descriptions in this regard are provided below with reference to FIGS. 11A and 11B. In another optional or additional embodiment, the storage controller 11 may select the victim sub-block based on a ratio of the valid page count VPC to the invalid page count IPC. Detailed descriptions in this regard are provided below with reference to FIGS. 12A and 12B. In another optional or additional embodiment, the storage controller 11 may select the victim sub-block based on a ratio of the valid page count VPC to a block size. For example, the block size may correspond to the number of word lines and/or the total number of pages. Detailed descriptions in this regard are provided below with reference to FIGS. 13A to 14B.

Figure 11A:
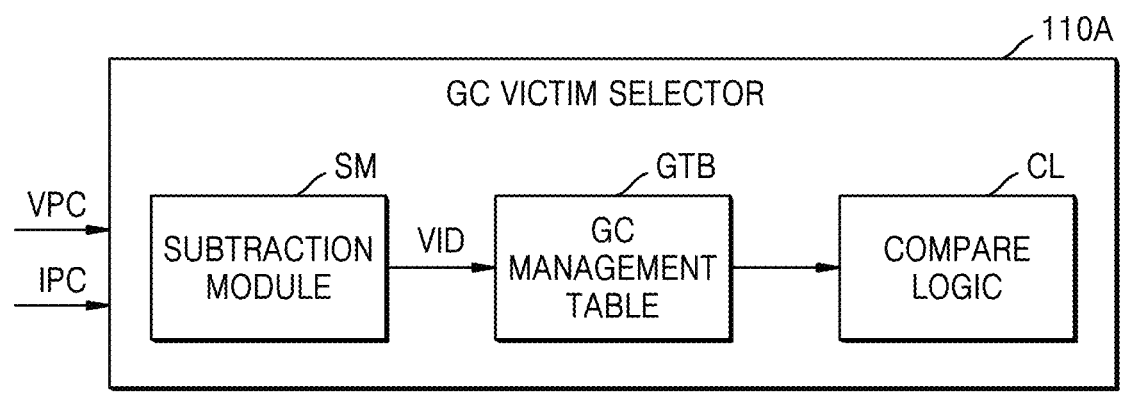
FIG. 11A is a block diagram of a garbage collection victim selector, according to an embodiment.

FIG. 11A is a block diagram of a garbage collection victim selector 110A, according to an embodiment. FIG. 11B illustrates a garbage collection management table 110B, according to an embodiment.

Referring to FIGS. 11A and 11B, the garbage collection victim selector 110A may include a subtraction module SM, a garbage collection management table GTB, and a compare logic CL. In some embodiments, the garbage collection victim selector 110A may be included in the garbage collection module 112 of FIG. 1 and/or the garbage collection victim selection component VS of FIG. 8.

The garbage collection victim selector 110A may receive a valid page count VPC and an invalid page count IPC corresponding to each of a plurality of sub-blocks. The subtraction module SM may output a difference value VID by subtracting the valid page count VPC from the invalid page count IPC (e.g., VID=IPC−VPC).

As shown in FIG. 11B, the garbage collection management table GTB may include the garbage collection management table 110B that stores garbage collection indexes respectively corresponding to first sub-block SUB_BLK1 and second sub-block SUB_BLK2. In an embodiment, the garbage collection management table 110B may store a first valid page count VPCa, a first invalid page count IPCa, and a first difference value VIDa, which correspond to the first sub-block SUB_BLK1. Alternatively or additionally, the garbage collection management table 110B may store a second valid page count VPCb, a second invalid page count IPCb, and a second difference value VIDb, which correspond to the second sub-block SUB_BLK2. For example, when the first valid page count VPCa is 43 and the first invalid page count IPCa is 57, the first difference value VIDa may be set to 14 (e.g., VIDa=57−3=14). For another example, when the second valid page count VPCb is 40 and the second invalid page count IPCb is 40, the second difference value VIDb may be set to 0 (e.g., VIDb=40−40=0).

In an embodiment, the compare logic CL may compare the first difference value VIDa of the first sub-block SUB_BLK1 and the second difference value VIDb of the second sub-block SUB_BLK2. The garbage collection victim selector 110A may select a sub-block corresponding to the greater (e.g., larger) value of the first difference value VIDa and the second difference value VIDb as a victim sub-block. For example, when the first difference value VIDa is 14 and the second difference value VIDb is 0, the garbage collection victim selector 110A may select the first sub-block SUB_BLK1 corresponding to the first difference value VIDa as the victim sub-block.

Figure 12A:
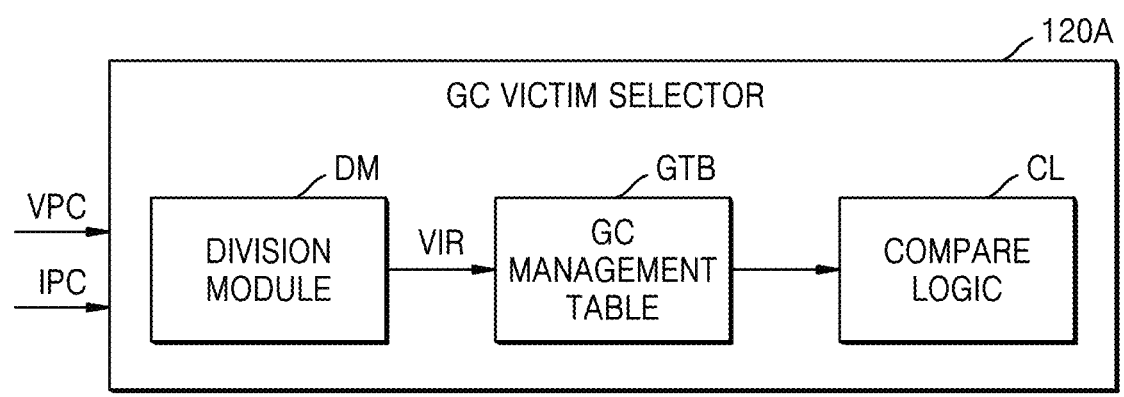
FIG. 12A is a block diagram of a garbage collection victim selector, according to an embodiment.

FIG. 12A is a block diagram of a garbage collection victim selector 120A, according to an embodiment. FIG. 12B illustrates a garbage collection management table 120B, according to an embodiment.

Referring to FIGS. 12A and 12B, the garbage collection victim selector 120A may include a division module DM, a garbage collection management table GTB, and a compare logic CL. In some embodiments, the garbage collection victim selector 120A may be included in the garbage collection module 112 of FIG. 1 and/or the garbage collection victim selection component VS of FIG. 8.

The garbage collection victim selector 120A may receive a valid page count VPC and an invalid page count IPC corresponding to each of a plurality of sub-blocks. The division module DM may output a ratio value of the valid page count VPC to the invalid page count IPC. That is, the division module DM may calculate a ratio value VIR of the invalid page count IPC and the valid page count VPC by dividing the valid page count VPC by the invalid page count IPC (e., VIR=VPC/IPC).

As shown in FIG. 12B, the garbage collection management table GTB may include the garbage collection management table 120B that stores garbage collection indexes respectively corresponding to first sub-block SUB_BLK1 and second sub-block SUB_BLK2. In an embodiment, the garbage collection management table 120B may store a first valid page count VPCa, a first invalid page count IPCa, and a first ratio value VIRa, which correspond to the first sub-block SUB_BLK1. Alternatively or additionally, the garbage collection management table 120B may store a second valid page count VPCb, a second invalid page count IPCb, and a second ratio value VIRb, which correspond to the second sub-block SUB_BLK2. For example, when the first valid page count VPCa is 43 and the first invalid page count IPCa is 57, the first ratio value VIRa may be set to approximately 0.75 (e.g., VIRa=43/57≈0.75). For another example, when the second valid page count VPCb is 40 and the second invalid page count IPCb is 40, the second ratio value VIRb may be set to approximately 1 (e.g., VIRb=40/40≈1).

In an embodiment, the compare logic CL may compare the first ratio value VIRa of the first sub-block SUB_BLK1 and the second ratio value VIRb of the second sub-block SUB_BLK2. The garbage collection victim selector 120A may select a sub-block corresponding to the smaller value of the first ratio value VIRa and the second ratio value VIRb as a victim sub-block. For example, when the first ratio value VIRa is 0.75 and the second ratio value VIRb is 1, the garbage collection victim selector 120A may select the first sub-block SUB_BLK1 corresponding to the first ratio value VIRa as the victim sub-block.

Figure 13A:
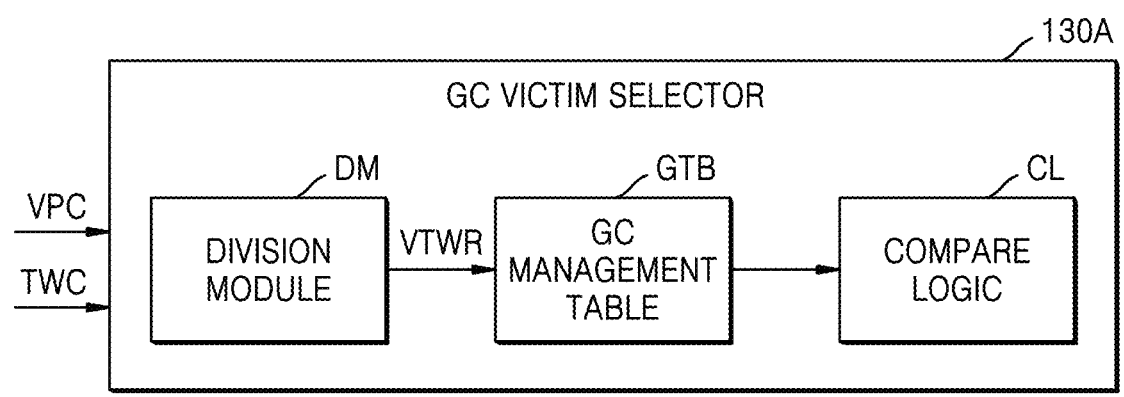
FIG. 13A is a block diagram of a garbage collection victim selector, according to an embodiment.

FIG. 13A is a block diagram of a garbage collection victim selector 130A, according to an embodiment. FIG. 13B illustrates a garbage collection management table 130B, according to an embodiment.

Referring to FIGS. 13A and 13B, the garbage collection victim selector 130A may include a division module DM, a garbage collection management table GTB, and a compare logic CL. In some embodiments, the garbage collection victim selector 130A may be included in the garbage collection module 112 of FIG. 1 and/or the garbage collection victim selection component VS of FIG. 8.

The garbage collection victim selector 130A may receive a valid page count VPC and a total word line count TWC corresponding to each of a plurality of sub-blocks. For example, the total word line count TWC may be the number of word lines connected to each sub-block, and may correspond to the block size of each sub-block. The division module DM may output a ratio value of the valid page count VPC to the total word line count TWC. That is, the division module DM may calculate a ratio value VTWR of the total word line count TWC and the valid page count VPC by dividing the valid page count VPC by the total word line count TWC (e.g., VTWR=VPC/TWC).

As shown in FIG. 13B, the garbage collection management table GTB may include the garbage collection management table 130B that stores garbage collection indexes respectively corresponding to first sub-block SUB_BLK1 and second sub-block SUB_BLK2. In an embodiment, the garbage collection management table 130B may store a first valid page count VPCa, a first total word line count TWCa, and a first ratio value VTWRa, which correspond to the first sub-block SUB_BLK1. Alternatively or additionally, the garbage collection management table 130B may store a second valid page count VPCb, a second total word line count TWCb, and a second ratio value VTWRb, which correspond to the second sub-block SUB_BLK2. For example, when the first valid page count VPCa is 43 and the first total word line count TWCa is 100, the first ratio value VIRa may be set to approximately 0.43 (e.g., VIRa=43/100≈0.43). For another example, when the second valid page count VPCb is 40 and the second total word line count TWCb is 80, the second ratio value VIRb may be set to approximately 0.5 (e.g., VIRb=40/80≈0.5).

In an embodiment, the compare logic CL may compare the first ratio value VTWRa of the first sub-block SUB_BLK1 and the second ratio value VTWRb of the second sub-block SUB_BLK2. The garbage collection victim selector 130A may select a sub-block corresponding to the smaller value of the first ratio value VTWRa and the second ratio value VTWRb as a victim sub-block. For example, when the first ratio value VTWRa is 0.43 and the second ratio value VTWRb is 0.5, the garbage collection victim selector 130A may select the first sub-block SUB_BLK1 corresponding to the first ratio value VTWRa as the victim sub-block.

Figure 14A:
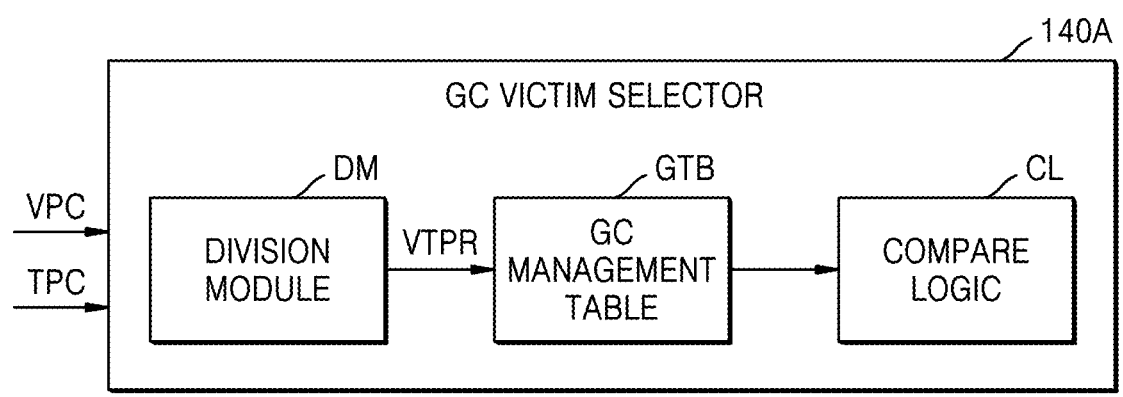
FIG. 14A is a block diagram of a garbage collection victim selector, according to an embodiment.

FIG. 14A is a block diagram of a garbage collection victim selector 140A, according to an embodiment. FIG. 14B illustrates a garbage collection management table 140B, according to an embodiment.

Referring to FIGS. 14A and 14B, the garbage collection victim selector 140A may include a division module DM, a garbage collection management table GTB, and a compare logic CL. In some embodiments, the garbage collection victim selector 140A may be included in the garbage collection module 112 of FIG. 1 and/or the garbage collection victim selection component VS of FIG. 8.

The garbage collection victim selector 140A may receive a valid page count VPC and a total page count TPC corresponding to each of a plurality of sub-blocks. For example, the total page count TPC may be the number of pages included in each sub-block, and may correspond to the block size of each sub-block. The division module DM may output a ratio value of the valid page count VPC to the total page count TPC. That is, the division module DM may calculate a ratio value VTPR of the total page count TPC and the valid page count VPC, by dividing the valid page count VPC by the total page count TPC (e.g., VTPR=VPC/TPC).

As shown in FIG. 14B, the garbage collection management table GTB may include the garbage collection management table 140B that stores garbage collection indexes respectively corresponding to first sub-block SUB_BLK1 and second sub-block SUB_BLK2. In an embodiment, the garbage collection management table 140B may store a first valid page count VPCa, a first total page count TPCa, and a first ratio value VTPRa, which correspond to the first sub-block SUB_BLK1. Alternatively or additionally, the garbage collection management table 140B may store a second valid page count VPCb, a second total page count TPCb, and a second ratio value VTPRb, which correspond to the second sub-block SUB_BLK2.

In an embodiment, the total page count TPC may correspond to a product of the number of word lines connected to a sub-block, the number of string select lines, and the number of data bits stored in each memory cell. For example, the number of word lines connected to the first sub-block SUB_BLK1 may be 100, the number of word lines connected to the second sub-block SUB_BLK2 may be 80, the number of string select lines connected to the first sub-block SUB_BLK1 and the second sub-block SUB_BLK2 may be 8, and the memory cells included in the first sub-block SUB_BLK1 and the second sub-block SUB_BLK2 may be quadruple-level cells (QLCs). In such an example, the first total page count TPCa may be set to 3,200 (e.g., TPCa=100×8×4=3,200), and the second total page count TPCb may be set to 2,560 (e.g., TPCb=80×8×4=2,560). As such, when the first valid page count VPCa is 43, the first ratio value VTPRa may be set to approximately 0.0134375 (e.g., VPCa=43/3,200≈0.0134375). Alternatively or additionally, when the second valid page count VPCb is 40, the second ratio value VTPRb may be set to approximately 0.015625 (e.g., VTPRb=40/2,560≈0.015625).

In an embodiment, the compare logic CL may compare the first ratio value VTPRa of the first sub-block SUB_BLK1 and the second ratio value VTPRb of the second sub-block SUB_BLK2. The garbage collection victim selector 140A may select a sub-block corresponding to the smaller value of the first ratio value VTPRa and the second ratio value VTPRb as a victim sub-block. For example, when the first ratio value VTPRa is 0.0134375 and the second ratio value VTPRb is 0.015625, the garbage collection victim selector 140A may select the first sub-block SUB_BLK1 corresponding to the first ratio value VTPRa as the victim sub-block.

In the examples described above with reference to FIGS. 10 to 14B, it may be assumed that the first sub-block 101 is connected (e.g., coupled) to 100 word lines, of which 43 word lines may correspond to valid pages VP (e.g., valid word lines) and 57 word lines may correspond to invalid pages IP (e.g., invalid word lines). Alternatively or additionally, it may be assumed that the second sub-block 102 is connected (e.g., coupled) to 80 word lines, of which 40 word lines may correspond to valid pages VP (e.g., valid word lines) and 40 word lines may correspond to invalid pages IP (e.g., invalid word lines). Hereinafter, for convenience of description, a word line corresponding to a valid page VP may be referred to as a valid word line, and a word line corresponding to an invalid page IP may be referred to as an invalid word line.

According to a comparative example, when a victim sub-block is selected based on a valid page count or the number of valid word lines of the first sub-block 101 and the second sub-block 102, the second sub-block 102 with the smaller number of valid word lines may be selected as the victim sub-block. When a garbage collection operation is performed on the second sub-block 102 selected as the victim sub-block, the second sub-block 102 may be changed to a free block by copying the valid pages VP of the second sub-block 102 to a target sub-block and erasing the second sub-block 102. For example, when a garbage collection operation is performed on the second sub-block 102, valid pages corresponding to the valid word lines (e.g. 40 valid word lines) of the second sub-block 102 may be copied, and pages corresponding to the word lines (e.g., 80 word lines) of the second sub-block 102 may be secured as free pages.

In embodiments described above with reference to FIGS. 11A to 14B, the first sub-block SUB_BLK1 may correspond to the first sub-block 101 of FIG. 10, and the second sub-block SUB_BLK2 may correspond to the second sub-block 102 of FIG. 10. According to embodiments described above with reference to FIGS. 11A to 14B, the first sub-block 101 with the lower ratio of the valid page count VPC to the invalid page count IPC may be selected as the victim sub-block. As shown in FIG. 10, the storage controller 11 may copy the valid page VP of the first sub-block 101 to a target sub-block(e.g., the fourth sub-block 104), and, accordingly, the first sub-block 101 may be changed to a first transform block 101' including only the invalid pages IP. Subsequently, the storage controller 11 may secure a first free block 101" by performing an erase operation on the first transform block 101'.

According to some embodiments, free pages FP corresponding to the valid word lines may be secured by copying the valid pages VP corresponding to the valid word lines of the first sub-block 101 to the fourth sub-block 104, which is the target sub-block, and erasing the first sub-block 101. As such, according to some embodiments, free pages corresponding to additional valid word lines (e.g., 20 valid word lines) may be secured by further copying valid pages corresponding to valid word lines (e.g., 3 valid word lines), compared to the comparative example.

A garbage collection cost according to execution of a garbage collection operation may be proportional to the number of valid pages to be copied (e.g., the valid page count VPC) and a garbage collection gain resulting from execution of garbage collection may be proportional to the number of invalid pages (e.g., the invalid page count IPC). According to some embodiments, because an increase in garbage collection gain is greater than an increase in garbage collection cost compared to related storage devices, performance degradation of the storage device (e.g., storage device 80 of FIG. 8) due to execution of a garbage collection operation may be reduced.

For example, the garbage collection cost (e.g., the time required for garbage collection operation) may be proportional to a product of the number of valid pages to be copied (e.g., the valid page count VPC) and a page migration time tMigration. The page migration time tMigration may correspond to the sum of a read time, a program time, and an erase time for a page. For example, when the second sub-block 102 is selected according to the comparative example, the time required for garbage collection operation may be proportional to 40×tMigration (e.g., tGC∝40×tMigration). Alternatively or additionally, when the first sub-block 101 is selected according to some embodiments, the time required for garbage collection operation may be proportional to 43×tMigration (e.g., tGC∝43×tMigration).

In an embodiment, the garbage collection gain may be proportional to a product of the total page count TPC of the victim sub-block and the tMigration. For example, when the second sub-block 102 is selected according to the comparative example, the garbage collection gain may be proportional to 80×tMigration (e.g., gGC∝80×tMigration). Alternatively or additionally, when the first sub-block 101 is selected according to some embodiments, the garbage collection gain may be proportional to 100×tMigration (e.g., gGC∝100×tMigration).

In an embodiment, garbage collection efficiency may correspond to a value obtained by subtracting the garbage collection cost from the garbage collection gain. For example, when the second sub-block 102 is selected according to the comparative example, the garbage collection efficiency may be proportional to 40×tMigration (e.g., eGC∝80×tMigration−40×tMigration). Alternatively or additionally, when the first sub-block 101 is selected according to some embodiments, the garbage collection efficiency may be proportional to 57×tMigration (e.g., eGC∝100×tMigration−43×tMigration). Accordingly, because the garbage collection efficiency may be higher than in related storage devices, the performance degradation of the storage device (e.g., storage device 80 of FIG. 8) due to the execution of a garbage collection operation may be reduced.

Figure 15:
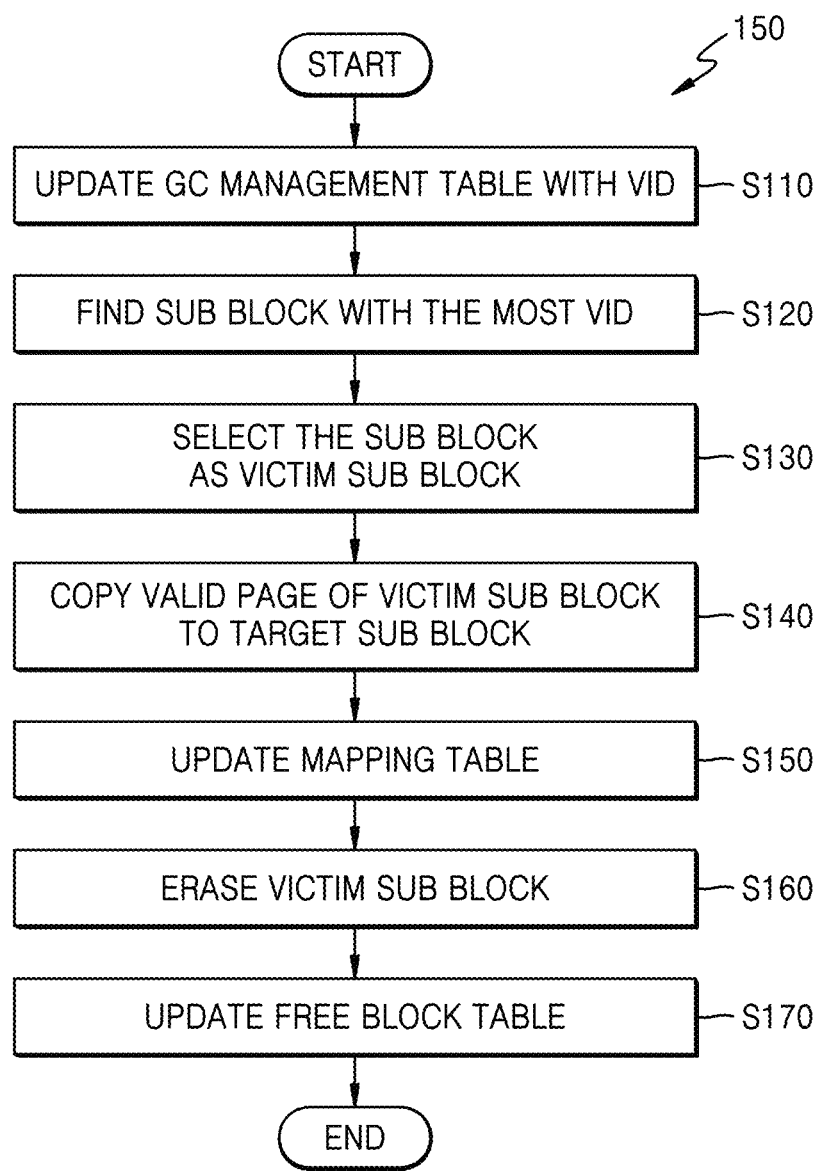
FIG. 15 is a flowchart of a method of performing a garbage collection operation, according to an embodiment.

FIG. 15 is a flowchart of a method of performing a garbage collection operation, according to an embodiment. Referring to FIG. 15, the method 150 of performing a garbage collection operation according to an embodiment may be performed by, for example, the storage controller 11 of FIG. 1 or 8. The descriptions provided above with reference to FIGS. 8 to 14B may be also applied to the method 150, and redundant descriptions thereof are omitted.

In operation S110, the garbage collection management table GTB may be updated with the difference value VID indicating a difference between the valid page count VPC and the invalid page count IPC. In operation S120, a sub-block with the greatest (e.g., largest) difference value VID may be found. In operation S130, the sub-block found in operation S120 may be selected as a victim sub-block. In operation S140, a valid page of the victim sub-block may be copied to a target sub-block. In operation S150, the mapping table MTB may be updated. In operation S160, an erase operation may be performed on the victim sub-block. In operation S170, a free block table may be updated. For example, the storage controller 11 may manage a free block table that stores information on free blocks. The victim sub-block may be converted into a free block when the erase operation on the victim sub-block is completed, and information on the free block may be updated in the free block table.

Figure 16:
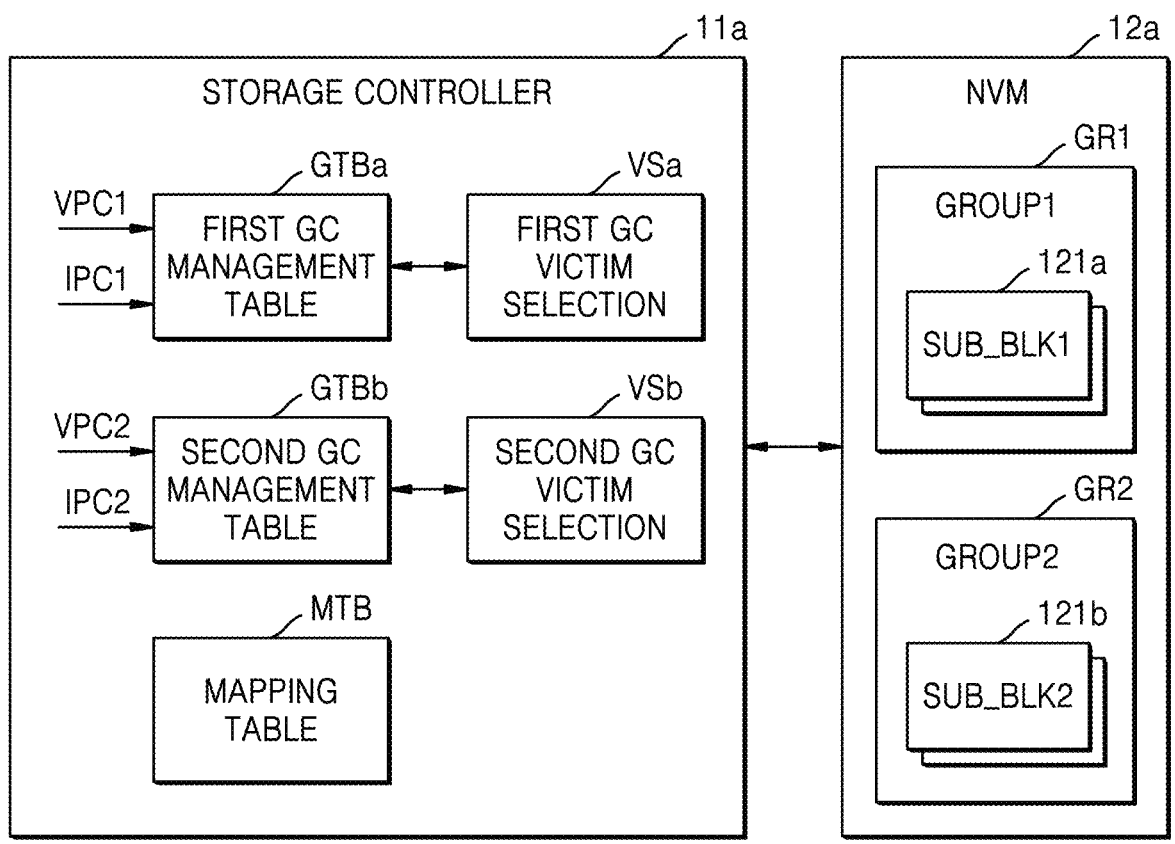
FIG. 16 is a block diagram of a storage device, according to an embodiment.

FIG. 16 is a block diagram of a storage device 160, according to an embodiment. Referring to FIG. 16, the storage device 160 may include a storage controller 11a and an NVM 12a, and may correspond to an implementation example of the storage device 10 of FIG. 1. That is, the storage device 160 of FIG. 16 may include or may be similar in many respects to at least one of the storage device 10 of FIG. 1 and the storage device 80 of FIG. 8, and may include additional features not mentioned above. Furthermore, the storage controller 11a and the NVM 12a of FIG. 16 may include or may be similar in many respects to their corresponding components described above with reference to FIGS. 1 and 8, and may include additional features not mentioned above.

The NVM 12a may include a first group GR1 and a second group GR2. The first group GR1 may include a plurality of first sub-blocks 121a, and the second group GR2 may include a plurality of second sub-blocks 121b. Each of the plurality of first sub-blocks 121a may have a first block size, and may include a plurality of memory cells. Each of the plurality of second sub-blocks 121b may have a second block size, and may include a plurality of memory cells. In an embodiment, the first block size may be different from the second block size. In an optional or additional embodiment, each of the plurality of first sub-blocks 121a may be connected (e.g., coupled) to the first word line group WGR1 of FIG. 5, 6, or 7. Alternatively or additionally, each of the plurality of second sub-blocks 121b may be connected (e.g., coupled) to the second word line group WGR2 of FIG. 5, 6, or 7.

The storage controller 11a may include a first garbage collection management tablea GTBa, a second garbage collection management table GTBb, a first garbage collection victim selection component VSa, a second garbage collection victim selection component VSb, and a mapping table MTB. For example, the first and second garbage collection management tables GTBa and GTBb and the first and second garbage collection victim selection components VSa and VSb may be included in the garbage collection module 112 of FIG. 1. For another example, the first and second garbage collection management tables GTBa and GTBb, the first and second garbage collection victim selection components VSa and VSb, and the mapping table MTB may be loaded into a working memory. That is, the components of storage controller 11a of FIG. 16 may be integrated with each other and implemented as an integrated circuit, software, and/or a combination of circuits and software, as described above with reference to FIG. 1.

In an embodiment, the storage controller 11a may correspond to a modified example of the storage controller 11 of FIG. 8, and the descriptions provided above with reference to FIGS. 8 to 15 may also be applied to the storage controller 11a of FIG. 16.

The first garbage collection management table GTBa may store the number of valid pages corresponding to each of the plurality of first sub-blocks 121a (e.g., a first valid page count VPC1) and the number of invalid pages corresponding to each of the plurality of first sub-blocks 121a (e.g., a first invalid page count IPC1). The second garbage collection management table GTBb may store the number of valid pages corresponding to each of the plurality of second sub-blocks 121b (e.g., a second valid page count VPC2) and the number of invalid pages corresponding to each of the plurality of second sub-blocks 121b (e.g., a second invalid page count IPC2).

The first garbage collection victim selection component VSa may select a victim sub-block from among the plurality of first sub-blocks 121a included in the first group GR1 by referring to the first garbage collection management table GTBa. The second garbage collection victim selection component VSb may select a victim sub-block from among the plurality of second sub-blocks 121b included in the second group GR2 by referring to the second garbage collection management table GTBb. In an embodiment, the first garbage collection victim selection component VSa may select the victim sub-block from among the first sub-blocks 121a when a free block is requested in the first group GR1, and the second garbage collection victim selection component VSb may select the victim sub-block from among the second sub-blocks 121b when a free block is requested in the second group GR2.

In an embodiment, the first garbage collection victim selection component VSa may compare the first valid page count VPC1 with a threshold value, and may select a first victim sub-block according to the comparison result. For example, when the first valid page count VPC1 is greater than or equal to the threshold value, a sub-block with the lowest (e.g., smallest) first valid page count VPC1 from among the first sub-blocks 121a may be selected as the first victim sub-block. Alternatively or additionally, when the first valid page count VPC1 is less than the threshold value, a sub-block with the highest (e.g., largest) first invalid page count IPC1 from among the first sub-blocks 121a may be selected as the first victim sub-block.

In an embodiment, the second garbage collection victim selection component VSb may compare the second valid page count VPC2 with a threshold value, and may select a second victim sub-block according to the comparison result. For example, when the second valid page count VPC2 is greater than or equal to the threshold value, a sub-block with the lowest (e.g., smallest) second valid page count VPC2 from among the second sub-blocks 121b may be selected as the second victim sub-block. Alternatively or additionally, when the second valid page count VPC2 is less than the threshold value, a sub-block with the highest (e.g., largest) second invalid page count IPC2 from among the second sub-blocks 121b may be selected as the second victim sub-block.

In an embodiment, the threshold value may change according to a program time, a read time, and an erase time. For example, a page migration time may correspond to the sum of the program time, the read time, and the erase time, and the threshold value may change depending on the page migration time. In an optional or additional embodiment, the threshold value may be changed according to a degree of wear of a sub-block, for example, a program/erase cycle count.

The mapping table MTB may store physical addresses of the NVM 12a respectively corresponding to logical addresses received from the host 20. The storage controller 11a may update the first garbage collection management table GTBa or the second garbage collection management table GTBb, and the mapping table MTB, when a garbage collection operation is performed. For example, the storage controller 11a may update the first garbage collection management table GTBa and the mapping table MTB when a write operation on a target sub-block is completed during a garbage collection operation on the first group GR1. For another example, the storage controller 11a may update the second garbage collection management table GTBb and the mapping table MTB when a write operation on a target sub-block is completed during a garbage collection operation on the second group GR2.

An operating method of the storage controller 11a, according to an embodiment, may correspond to a garbage collection operating method of the storage controller 11a. The operating method may include performing a first garbage collection operation on the first sub-blocks 121a and performing a second garbage collection operation on the second sub-blocks 121b. The performing of the first garbage collection operation may include selecting a sub-block with the lowest (e.g., smallest) first valid page count VPC1 from among the first sub-blocks 121a as a first victim sub-block, copying a valid page of the first victim sub-block to a first target sub-block from among first sub-blocks 121a, and performing an erase operation on the first victim sub-block. The performing of the second garbage collection operation may include selecting a second victim sub-block from among the second sub-blocks 121b, copying a valid page of a second victim sub-block to a second target sub-block from among second sub-blocks 121b, and performing an erase operation on the second victim sub-block.

Figure 17:
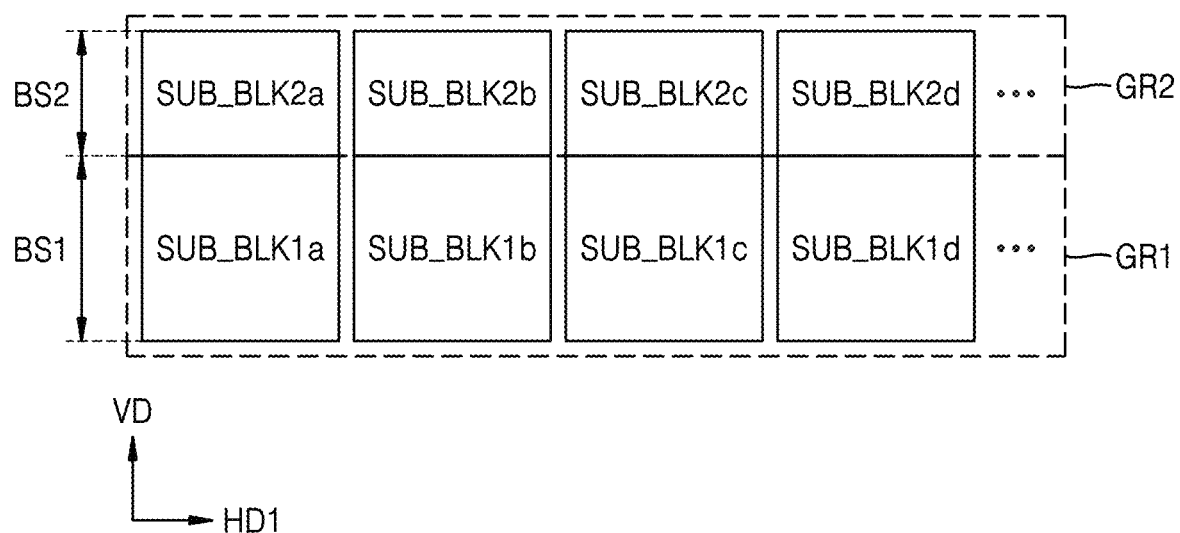
FIG. 17 illustrates a non-volatile memory including sub-blocks having different block sizes, according to an embodiment.

FIG. 17 illustrates an NVM 170 including sub-blocks having different block sizes, according to an embodiment. Referring to FIG. 17, the NVM 170 may include a first group GR1 and a second group GR2. The first group GR1 may include first sub-blocks SUB_BLK1a to SUB_BLK1d, and the second group GR2 may include second sub-blocks SUB_BLK2a to SUB_BLK2d. For example, the NVM 170 may correspond to an example of the NVM 12a of FIG. 16, and, as such, the first sub-blocks SUB_BLK1a to SUB_BLK1d of FIG. 17 may correspond to the first sub-blocks 121a of FIG. 16, and the second sub-blocks SUB_BLK2a to SUB_BLK2d of FIG. 17 may correspond to the second sub-blocks 121b of FIG. 16.

In an embodiment, the first sub-blocks SUB_BLK1a to SUB_BLK1d may be adjacent to each other in a first direction HD1, and the second sub-blocks SUB_BLK2a to SUB_BLK2d may be adjacent to each other in the first direction HD1. However, the present disclosure is not limited thereto. Alternatively or additionally, the first sub-block SUB_BLK1a and the second sub-block SUB_BLK2a may be adjacent to each other in a vertical direction VD and may constitute a memory block BLK. Each of the first sub-blocks SUB_BLK1a to SUB_BLK1d may have a first block size BS1 in the vertical direction VD, and each of the second sub-blocks SUB_BLK2a to SUB_BLK2d may have a second block size BS2 in the vertical direction VD. In an embodiment, the first block size BS1 may be different from the second block size BS2.

Figure 18:
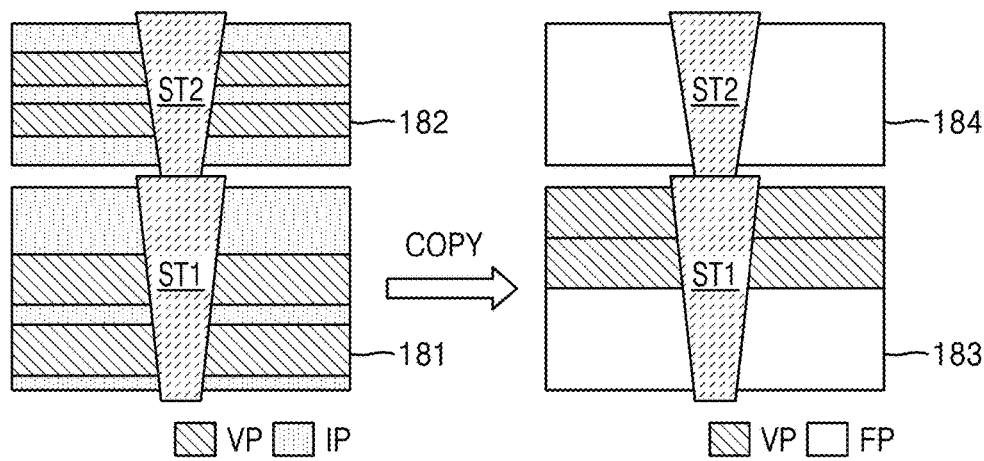
FIG. 18 illustrates a garbage collection operation of a storage controller of FIG. 16, according to an embodiment.
Figure 18:
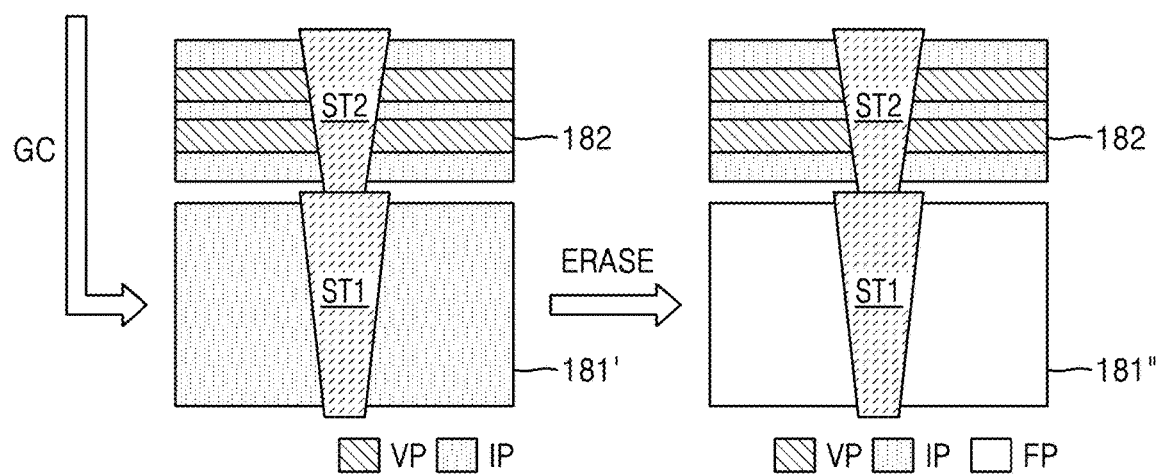

FIG. 18 illustrates a garbage collection operation of the storage controller 11a of FIG. 16, according to an embodiment. Referring to FIG. 18, a first sub-block 181 and a second sub-block 182 may be stacked in a vertical direction. The first sub-block 181 and the second sub-block 182 may correspond to, for example, the first sub-block SUB_BLK1a and the second sub-block SUB_BLK2a of FIG. 17, respectively. A third sub-block 183 and a fourth sub-block 184 may be stacked in the vertical direction. The third sub-block 183 and the fourth sub-block 184 may correspond to, for example, the first sub-block SUB_BLK1b and the second sub-block SUB_BLK2b of FIG. 17, respectively.

The first sub-block 181 and the third sub-block 183 may correspond to a first memory stack ST1, and may be included in the first group GR1. The second sub-block 182 and the fourth sub-block 184 may correspond to a second memory stack ST2, and may be included in the second group GR2.

The garbage collection operation depicted in FIG. 18 may correspond to a modified example of the garbage collection operation of FIG. 10, and redundant descriptions thereof are omitted. The first sub-block 181 and the second sub-block 182 may each include valid pages VP and invalid pages IP. For example, the number of word lines connected (e.g., coupled) to each of the first sub-block 181 and the third sub-block 183 of the first group GR1 may be 100, and the number of word lines connected to each of the second sub-block 182 and the fourth sub-block 184 of the second group GR2 may be 80. As such, the block size of a sub-block corresponding to the first memory stack ST1 may be greater than the block size of a sub-block corresponding to the second memory stack ST2.

According to some embodiments, when a free block is requested for the first group GR1, the storage controller 11a may select a sub-block with the lowest (e.g., smallest) first valid page count VPC1 from among the first sub-block 181 and the third sub-block 183 as a first victim sub-block. Alternatively or additionally, when a free block is requested for the second group GR2, the storage controller 11a may select a sub-block with the lowest (e.g., smallest) second valid page count VPC2 from among the second sub-block 182 and the fourth sub-block 184 as a second victim sub-block.

In an embodiment, the storage controller 11a may select the first victim sub-block for the first group GR1 based on the first valid page count VPC1, and may select the second victim sub-block for the second group GR2 based on the second valid page count VPC2. Detailed descriptions in this regard are provided below with reference to FIGS. 19A and 19B. In an embodiment, the storage controller 11a may select the first victim sub-block for the first group GR1 based on a difference between the first valid page count VPC1 and the first invalid page count IPC1, and may select the second victim sub-block for the second group GR2 based on a difference between the second valid page count VPC2 and the second invalid page count IPC2. Detailed descriptions in this regard are provided below with reference to FIGS. 20A and 20B.

In an embodiment, the storage controller 11a may select a victim sub-block based on a ratio of the valid page count VPC to the invalid page count IPC for each group, as described above with reference to FIGS. 12A and 12B. In an embodiment, the storage controller 11a may select the victim sub-block based on a ratio of the valid page count VPC to a block size for each group. For example, the block size may correspond to the number of word lines and/or the total number of pages, as described above with reference to FIGS. 13A to 14B.

Figure 19A:
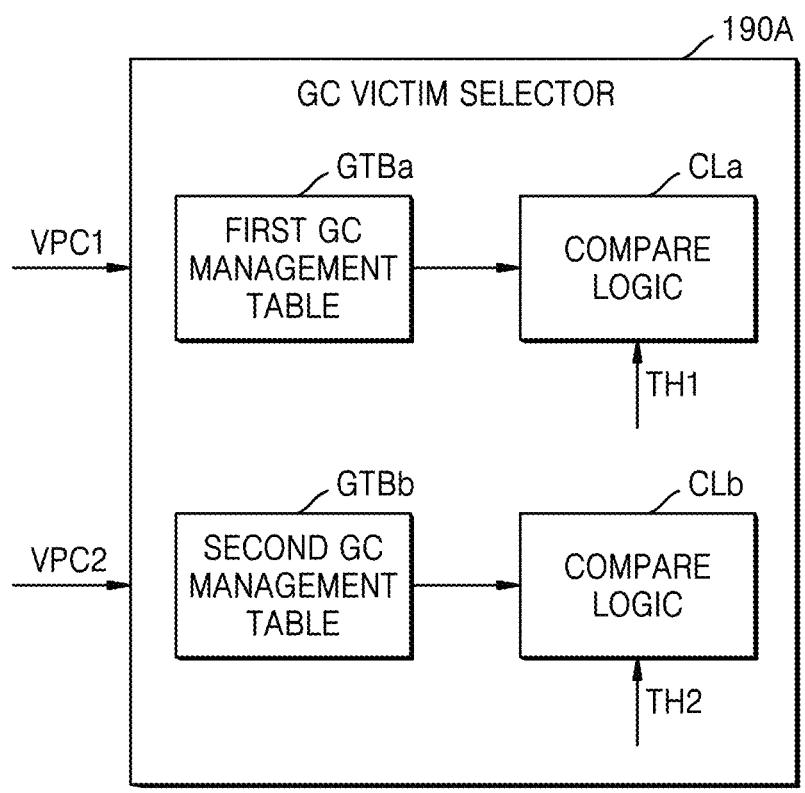
FIG. 19A is a block diagram of a garbage collection victim selector, according to an embodiment.

FIG. 19A is a block diagram of a garbage collection victim selector 190A, according to an embodiment. FIG. 19B illustrates first and second garbage collection management tables 190B and 190C, according to an embodiment.

Referring to FIGS. 19A and 19B, the garbage collection victim selector 190A may include first and second garbage collection management tables GTBa and GTBb and first and second compare logics CLa and CLb. For example, the garbage collection victim selector 190A may be included in the garbage collection module 112 of FIG. 1 and/or the garbage collection victim selection component VS of FIG. 8.

The garbage collection victim selector 190A may receive a first valid page count VPC1 corresponding to each of a plurality of first sub-blocks SUB_BLK1a and SUB_BLK1b of a first group GR1, and a second valid page count VPC2 corresponding to each of a plurality of second sub-blocks SUB_BLK2a and SUB_BLK2b of a second group GR2.*

In an embodiment, the first garbage collection management table GTBa may include the first garbage collection management table 190B, which stores garbage collection indexes respectively corresponding to the first sub-blocks SUB_BLK1a and SUB_BLK1b. For example, the first garbage collection management table 190B may store a first valid page count VPC1a corresponding to the first sub-block SUB_BLK1a and a first valid page count VPC1b corresponding to the first sub-block SUB_BLK1b.

In an embodiment, the second garbage collection management table GTBb may include the second garbage collection management table 190C, which stores garbage collection indexes respectively corresponding to the second sub-blocks SUB_BLK2a and SUB_BLK2b. For example, the second garbage collection management table 190C may store a second valid page count VPC2a corresponding to the second sub-block SUB_BLK2a and a second valid page count VPC2b corresponding to the second sub-block SUB_BLK2b.

In an embodiment, the garbage collection victim selector 190A may compare the first valid page count VPC1 with a first threshold value TH1, and may select a first victim sub-block according to the comparison result. For example, when the first valid page count VPC1 is greater than or equal to the first threshold value TH1, a sub-block with the lowest (e.g., smallest) first valid page count VPC1 from among the first sub-blocks SUB_BLK1a and SUB_BLK1b may be selected as the first victim sub-block. Alternatively or additionally, when the first valid page count VPC1 is less than the first threshold value TH1, a sub-block with the highest (e.g., largest) invalid page count IPC from among the first sub-blocks SUB_BLK1a and SUB_BLK1b may be selected as the victim sub-block.

In an embodiment, the threshold value may change according to a program time, a read time, and an erase time. That is, a page migration time may correspond to the sum of the program time, the read time, and the erase time. Alternatively or additionally, the threshold value may change depending on the page migration time. In an embodiment, the threshold value may be changed according to a degree of wear of a sub-block, for example, a program/erase cycle count.

The garbage collection victim selector 190A may select a sub-block corresponding to the smaller value of the first valid page counts VPC1a and VPC1b as the first victim sub-block, and may select a sub-block corresponding to the smaller value of the second valid page counts VPC2a and VPC2b as a second victim sub-block. As such, the garbage collection victim selector 190A may independently perform an operation of selecting the first victim sub-block for the first group GR1 and an operation of selecting the second victim sub-block for the second group GR2. Alternatively or additionally, the storage controller 11a may independently perform a first garbage collection operation on the first group GR1 and a second garbage collection operation on the second group GR2.

Figure 20A:
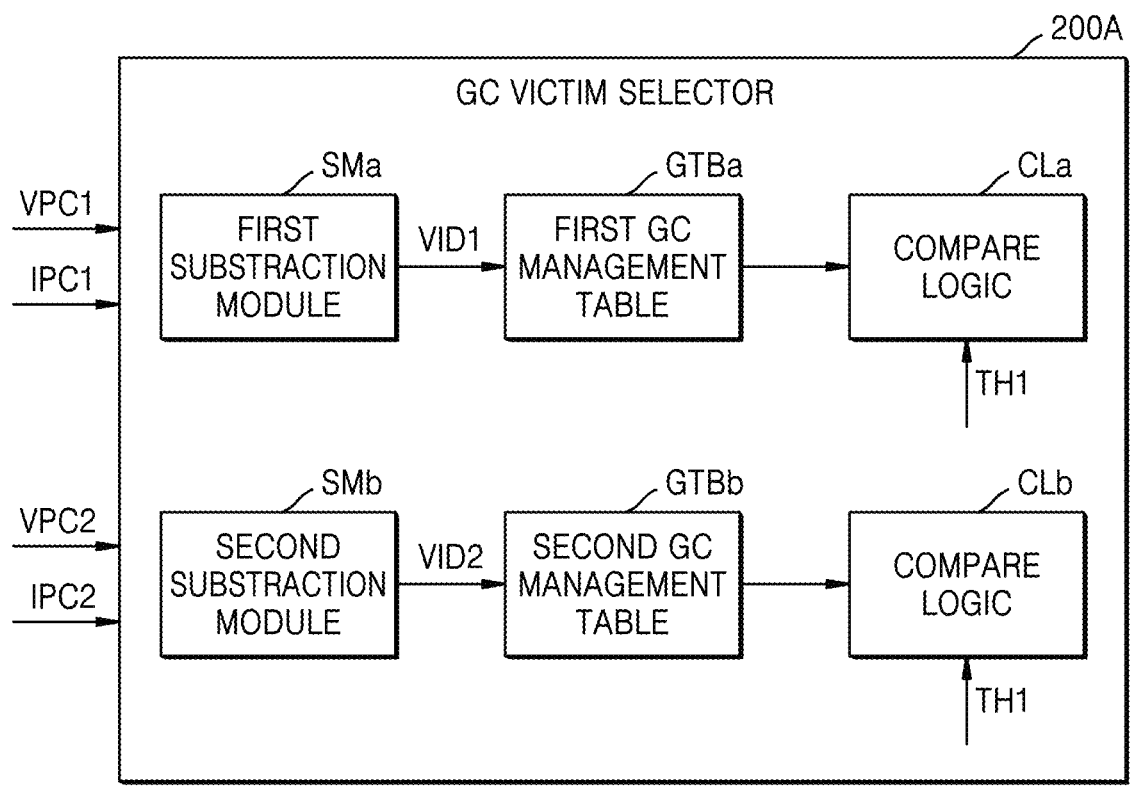
FIG. 20A is a block diagram of a garbage collection victim selector, according to an embodiment.

FIG. 20A is a block diagram of a garbage collection victim selector 200A, according to an embodiment, and FIG. 20B illustrates first and second garbage collection management tables 200B and 200C, according to an embodiment.

Referring to FIGS. 20A and 20B, the garbage collection victim selector 200A includes a first subtraction module SMa, a second subtraction module SMb, a first garbage collection management table GTBa, a second garbage collection management table GTBb, a first compare logic CLa, and a second compare logic CLb. In an embodiment, the garbage collection victim selector 200A may be included in the garbage collection module 112 of FIG. 1 and/or the garbage collection victim selection component VS of FIG. 8.

The garbage collection victim selector 200A may receive a first valid page count VPC1 and a first invalid page count IPC1 corresponding to each of a plurality of first sub-blocks, and may receive a second valid page count VPC2 and a second invalid page count IPC2 corresponding to each of a plurality of second sub-blocks.

In an embodiment, the first garbage collection management table GTBa may include the first garbage collection management table 200B that stores garbage collection indexes respectively corresponding to first sub-blocks SUB_BLK1a and SUB_BLK1b. For example, the first garbage collection management table 200B may store a first valid page count VPC1a, a first invalid page count IPC1a, and a first difference value VID1a, which corresponds to the first sub-block SUB_BLK1a. Alternatively or additionally, the first garbage collection management table 200B may store a first valid page count VPC1b, a first invalid page count IPC1b, and a first difference value VID1b, which corresponds to the first sub-block SUB_BLK1b.

In an embodiment, the second garbage collection management table GTBb may include the second garbage collection management table 200C that stores garbage collection indexes respectively corresponding to second sub-blocks SUB_BLK2a and SUB_BLK2b. For example, the second garbage collection management table 200C may store a second valid page count VPC2a, a second invalid page count IPC2a, and a second difference value VID2a, which corresponds to the second sub-block SUB_BLK2a. Alternatively or additionally, the second garbage collection management table GTBb may store a second valid page count VPC2b, a second invalid page count IPC2b, and a second difference value VID2b, which corresponds to the second sub-block SUB_BLK2b.

The first compare logic CLa may compare the first difference value VID1a of the first sub-block SUB_BLK1a and the first difference value VID1b of the first sub-block SUB_BLK1b. In an embodiment, the first compare logic CLa may receive a first threshold value TH1, and when a ratio of a valid page count to an invalid page count of the first group GR1 is greater than or equal to the first threshold value TH1, the first compare logic CLa may perform a comparison operation on the first difference values VID1a and VID1b.

The second compare logic CLb may compare the second difference value VID2a of the second sub-block SUB_BLK2a and the second difference value VID2b of the second sub-block SUB_BLK2b. In an embodiment, the second compare logic CLb may receive a second threshold value TH2, and when a ratio of a valid page count to an invalid page count of the second group GR2 is greater than or equal to the second threshold value TH2, the second compare logic CLb may perform a comparison operation on the second difference values VID2a and VID2b.

The garbage collection victim selector 200A may select a first sub-block corresponding to the greater (e.g., larger) value of the first difference values VID1a and VID1b as a first victim sub-block, and may select a second sub-block corresponding to the greater (e.g., larger) value of the second difference values VID2a and VID2b as a second victim sub-block. As such, the garbage collection victim selector 200A may independently perform an operation of selecting the first victim sub-block for the first group GR1 and an operation of selecting the second victim sub-block for the second group GR2. Alternative or additionally, the storage controller 11a may independently perform a first garbage collection operation on the first group GR1 and a second garbage collection operation on the second group GR2.

In embodiments described above with reference to FIGS. 19A to 20B, the first sub-block SUB_BLK1a may correspond to the first sub-block 181 of FIG. 18, and the second sub-block SUB_BLK2a may correspond to the second sub-block 182 of FIG. 18. According to embodiments described above, the first sub-block 181 with the lowest (e.g., smallest) valid page count VPC in the first group GR1 may be selected as the victim sub-block. As shown in FIG. 18, the storage controller 11a may copy the valid page VP of the first sub-block 181 to a target sub-block of the first group GR1, (e.g., the fourth sub-block 184), and, accordingly, the first sub-block 181 may be changed to a first transform block 181' including only the invalid pages IP. Subsequently, the storage controller 11a may secure a first free block 181" by performing an erase operation on the first transform block 181'. As described above with reference to FIGS. 11A to 14B, according to some embodiments, garbage collection efficiency may be improved compared to related storage devices, and performance degradation of the storage device (e.g., storage device 160 of FIG. 16) due to execution of a garbage collection operation may be reduced.

Figure 21:
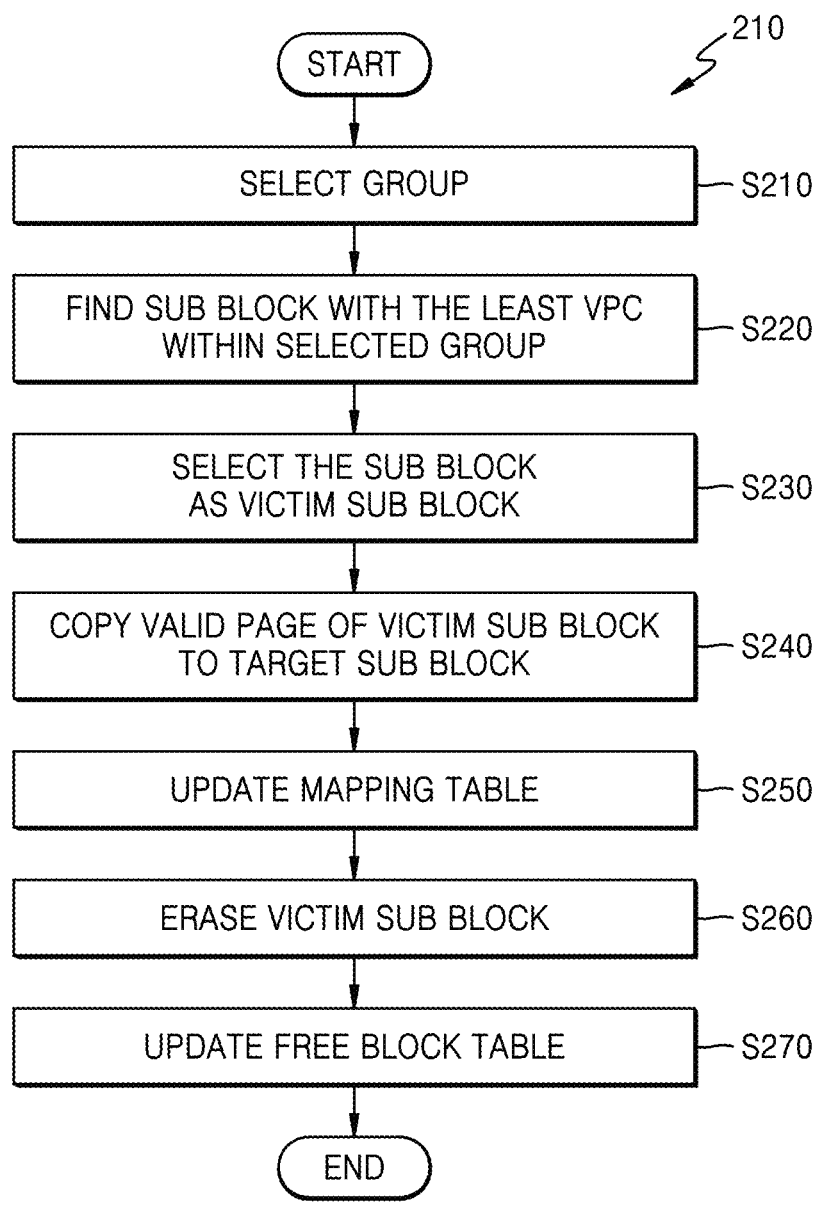
FIG. 21 is a flowchart of a method of performing a garbage collection operation, according to an embodiment.

FIG. 21 is a flowchart of a method of performing a garbage collection operation, according to an embodiment. Referring to FIG. 21, the method 210 of performing a garbage collection operation according to an embodiment may be performed by, for example, the storage controller 11a of FIG. 16 and/or the storage controller 11 of FIG. 1 or 8. The descriptions provided above with reference to FIGS. 16 to 20B may be also applied to the method 210, and redundant descriptions thereof are omitted.

In operation S210, a group on which a garbage collection operation is to be performed may be selected. For example, a group that needs a free block may be found, and the group may be selected as the group on which the garbage collection operation is to be performed. In operation S220, a sub-block with the lowest (e.g., smallest) valid page count VPC may be found within the selected group. In operation S230, the sub-block found in operation S220 may be selected as a victim sub-block. In operation S240, a valid page of the victim sub-block may be copied to a target sub-block. In operation S250, the mapping table MTB may be updated. In operation S260, an erase operation may be performed on the victim sub-block. In operation S270, a free block table may be updated. For example, the storage controller 11a may manage a free block table that stores information on free blocks. The victim sub-block may be converted into a free block when the erase operation on the victim sub-block is completed, and information on the free block may be updated in the free block table.

Figure 22:
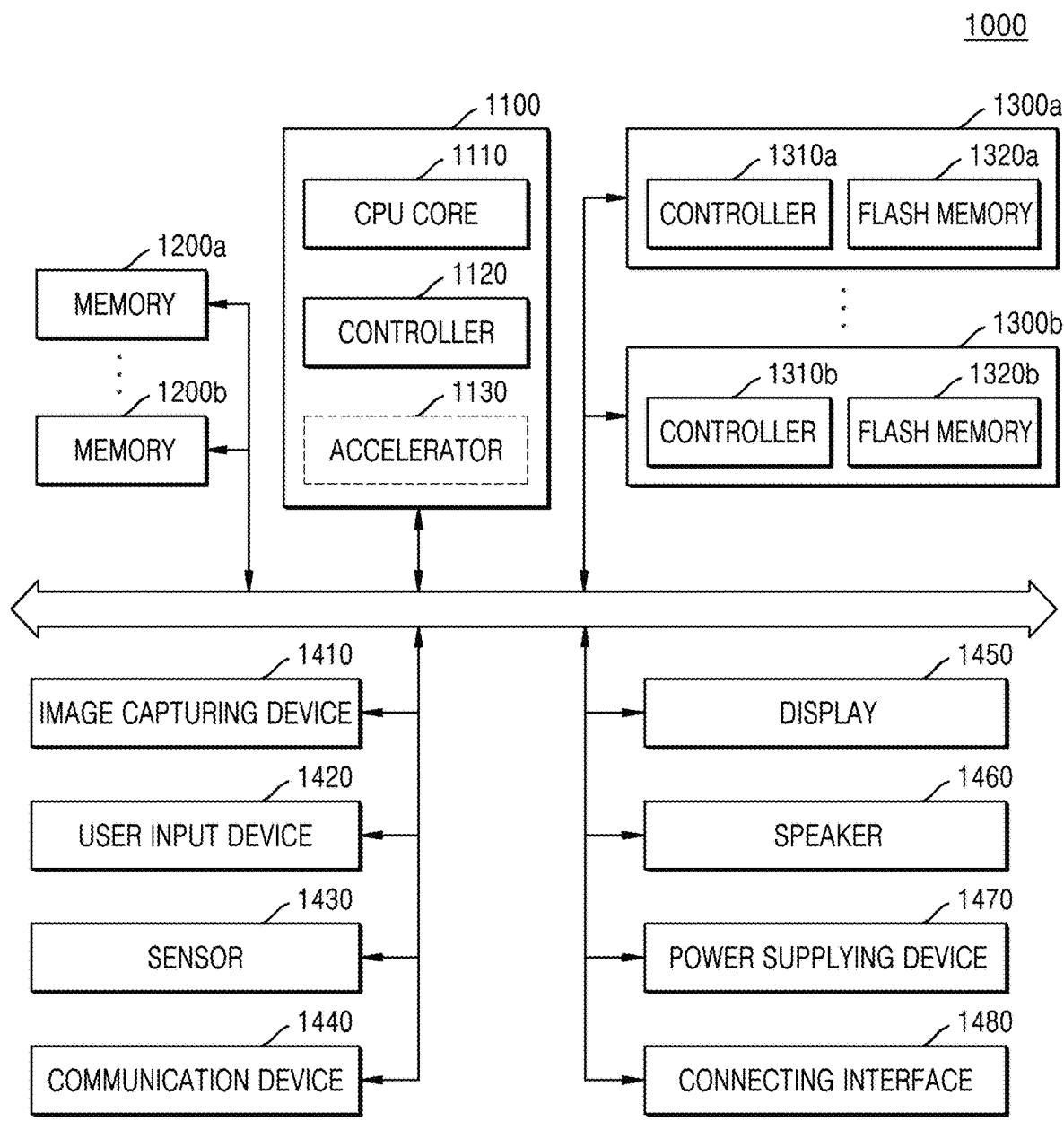
FIG. 22 illustrates a system to which a storage device is applied, according to an embodiment.

FIG. 22 is a diagram of a system 1000 to which a storage device is applied, according to an embodiment. The system 1000 of FIG. 22 may include a mobile system, such as but not limited to, a portable communication terminal (e.g., a mobile phone), a smartphone, a tablet personal computer (PC), a wearable device, a healthcare device, or an Internet of things (JOT) device. However, the system 1000 of FIG. 22 is not limited to the mobile system and may be another electronic device, such as but not limited to, a PC, a laptop computer, a server, a media player, or an automotive device (e.g., a navigation device).

Referring to FIG. 22, the system 1000 may include a main processor 1100, memories (e.g., 1200a and 1200b), and storage devices (e.g., 1300a and 1300b). Alternatively or additionally, the system 1000 may include at least one of an image capturing device 1410, a user input device 1420, a sensor 1430, a communication device 1440, a display 1450, a speaker 1460, a power supplying device 1470, and a connecting interface 1480.

The main processor 1100 may control the operations of the system 1000. Alternatively or additionally, the main processor 1100 may control operations of other components included in the system 1000. The main processor 1100 may be implemented as a general-purpose processor, a dedicated processor, or an application processor.

The main processor 1100 may include at least one CPU core 1110 and further include a controller 1120 configured to control the memories 1200a and 1200b and/or the storage devices 1300a and 1300b. In some embodiments, the main processor 1100 may further include an accelerator 1130, which may be a dedicated circuit for a high-speed data operation, such as but not limited to an artificial intelligence (AI) data operation. The accelerator 1130 may include a graphics processing unit (GPU), a neural processing unit (NPU) and/or a data processing unit (DPU) and/or be implemented as a chip that is physically separate from the other components of the main processor 1100.

The memories 1200a and 1200b may be used as main memory devices of the system 1000. Each of the memories 1200a and 1200b may include a volatile memory, such as, but not limited to, SRAM and/or DRAM. Alternatively or additionally, each of the memories 1200a and 1200b may include a non-volatile memory, such as, but not limited to, a flash memory, PRAM and/or RRAM. In some embodiments, the memories 1200a and 1200b may be implemented in the same package as the main processor 1100.

The storage devices 1300a and 1300b may serve as non-volatile storage devices configured to store data regardless of whether power is supplied thereto, and may have larger storage capacity than the memories 1200a and 1200b. The storage devices 1300a and 1300b may respectively include storage controllers 1310a and 1310b and NVMs 1320a and 1320b configured to store data via the control of the storage controllers 1310a and 1310b. Although the NVMs 1320a and 1320b may include flash memories having a 2D structure or a 3D V-NAND structure, the NVMs 1320a and 1320b may include other types of NVMs, such as PRAM and/or RRAM.

The storage devices 1300a and 1300b may be physically separated from the main processor 1100 and included in the system 1000 or implemented in the same package as the main processor 1100. Alternatively or additionally, the storage devices 1300a and 1300b may be types of SSDs or memory cards and may be removably combined with other components of the system 1000 through an interface, such as the connecting interface 1480 that is described below. The storage devices 1300a and 1300b may be devices to which a standard protocol, such as a UFS, an eMMC, or an NVMe, may be applied, without being limited thereto.

The image capturing device 1410 may capture still images and/or moving images. The image capturing device 1410 may include, but not be limited to, a camera, a camcorder, and/or a web cam.

The user input device 1420 may receive various types of data input by a user of the system 1000 and may include, but not be limited to, a touch pad, a keypad, a keyboard, a mouse, and/or a microphone.

The sensor 1430 may detect various types of physical quantities, which may be obtained from the outside of the system 1000, and convert the detected physical quantities into electric signals. For example, the sensor 1430 may include, but not be limited to, a temperature sensor, a pressure sensor, an illuminance sensor, a position sensor, an acceleration sensor, a biosensor, and/or a gyroscope sensor.

The communication device 1440 may transmit and receive signals between other devices outside the system 1000 according to various communication protocols. The communication device 1440 may include, but not be limited to, an antenna, a transceiver, and/or a modem.

The display 1450 and the speaker 1460 may serve as output devices configured to respectively output visual information and auditory information to the user of the system 1000.

The power supplying device 1470 may appropriately convert power supplied from a battery (not shown) embedded in the system 1000 and/or an external power source, and supply the converted power to each of components of the system 1000.

The connecting interface 1480 may provide connection between the system 1000 and an external device, which is connected to the system 1000 and capable of transmitting and/or receiving data to and/or from the system 1000. The connecting interface 1480 may be implemented by using various interface schemes, such as, but not be limited to, advanced technology attachment (ATA), serial ATA (SATA), external SATA (e-SATA), small computer small interface (SCSI), serial attached SCSI (SAS), peripheral component interconnection (PCI), PCI express (PCIe), NVMe, IEEE 1394, a universal serial bus (USB) interface, a secure digital (SD) card interface, a multi-media card (MMC) interface, an eMMC interface, a UFS interface, an embedded UFS (eUFS) interface, and a compact flash (CF) card interface.

While the present disclosure has been particularly shown and described with reference to embodiments thereof, it will be understood that various changes in form and details may be made therein without departing from the spirit and scope of the following claims.

What is claimed is:

1. A storage device, comprising:
a non-volatile memory comprising a plurality of sub-blocks that are independently erasable; and
a storage controller comprising a processor configured to control a garbage collection operation on the plurality of sub-blocks based on a block size of sub-blocks of the plurality of sub-blocks,
wherein the plurality of sub-blocks comprises:
a plurality of first sub-blocks, each first sub-block of the plurality of first sub-blocks being coupled to a first word line group and having a first block size, the first word line group comprising a plurality of first word lines stacked in a vertical direction; and
a plurality of second sub-blocks, each second sub-block of the plurality of second sub-blocks being coupled to a second word line group and having a second block size, the second block size being different from the first block size, the second word line group comprising a plurality of second word lines stacked in the vertical direction, and wherein the processor is further configured to:
select a victim sub-block with a lowest ratio of a valid page count to an invalid page count from among the plurality of sub-blocks; and
copy a valid page of the victim sub-block to a target sub-block from among the plurality of sub-blocks,
wherein both the victim sub-block and the target sub-block are selected from the plurality of first sub-blocks or the plurality of second sub-blocks and have a same block size.

2. The storage device of claim 1, wherein:
the first block size corresponds to a number of first word lines comprised by the plurality of first word lines, and
the second block size corresponds to a number of second word lines comprised by the plurality of second word lines.

3. The storage device of claim 1, wherein:
the first block size corresponds to a first total number of pages comprised by each first sub-block of the plurality of first sub-blocks, and
the second block size corresponds to a second total number of pages comprised by each second sub-block of the plurality of second sub-blocks.

4. The storage device of claim 1, wherein:
the plurality of sub-blocks respectively correspond to a plurality of memory stacks,
each memory stack of the plurality of memory stacks extends in the vertical direction on a substrate,
the plurality of first sub-blocks respectively correspond to first memory stacks of the plurality of memory stacks arranged on the substrate, and
the plurality of second sub-blocks respectively correspond to second memory stacks of the plurality of memory stacks arranged on the first memory stacks.

5. The storage device of claim 1, wherein the processor is further configured to:
calculate, for each sub-block of the plurality of sub-blocks, a difference value between the invalid page count and the valid page count; and
select, as the victim sub-block, a sub-block having a largest difference value from among the plurality of sub-blocks.

6. The storage device of claim 1, wherein the processor is further configured to:
calculate, for each sub-block of the plurality of sub-blocks, a ratio value of the valid page count to the invalid page count; and
select, as the victim sub-block, a sub-block with a smallest ratio value from among the plurality of sub-blocks.

7. The storage device of claim 1, wherein the processor is further configured to:
calculate, for each sub-block of the plurality of sub-blocks, a ratio value of the valid page count to a block size; and
select, as the victim sub-block, a sub-block with a smallest ratio value from among the plurality of sub-blocks.

8. The storage device of claim 1, wherein the processor is further configured to:
manage a garbage collection management table of the plurality of sub-blocks;
update the garbage collection management table according to the garbage collection operation on the plurality of sub-blocks; and
control the garbage collection operation on the plurality of sub-blocks based on the garbage collection management table.

9. The storage device of claim 1, wherein the processor is further configured to:
manage a mapping table storing physical addresses of the non-volatile memory respectively corresponding to logical addresses received from a host; and
wherein to copy the valid page of the victim sub-block comprises to update the mapping table after copying the valid page of the victim sub-block to the target sub-block.

10. The storage device of claim 1, wherein the processor is further configured to:
control, in a first mode, a first erase operation on the non-volatile memory in sub-block units; and
control, in a second mode, a second erase operation on the non-volatile memory in block units,
wherein each of the block units comprises at least two sub-blocks.

11. The storage device of claim 1, wherein the processor is further configured to:
select the victim sub-block having the lowest ratio of the valid page count to the invalid page count from among the plurality of sub-blocks based on at least one of a program/erase cycle count and a page migration time of each sub-block of the plurality of sub-blocks.

12. A storage device, comprising:
a non-volatile memory comprising first sub-blocks and second sub-blocks, each of the first sub-blocks having a first block size and comprising a first plurality of memory cells, each of the second sub-blocks having a second block size and comprising a second plurality of memory cells, the second block size being different from the first block size; and a processor configured to control a first garbage collection operation on the first sub-blocks having the first block size independently from a second garbage collection operation on the second sub-blocks having the second block size, based on a block size of the first sub-blocks and the second sub-blocks, wherein the processor is further configured to:
copy a valid page of a first victim sub-block from among the first sub-blocks to a first target sub-block from among the first sub-blocks, based on a first garbage collection management table of the first sub-blocks, the first victim sub-block having a lowest valid page count from among the first sub-blocks; and copy a valid page of a second victim sub-block from among the second sub-blocks to a second target sub-block from among the second sub-blocks, based on a second garbage collection management table of the second sub-blocks, the second victim sub-block having a lowest valid page count from among the second sub-blocks.

13. The storage device of claim 12, wherein:
the first garbage collection management table is configured to store a valid page count of each of the first sub-blocks, and
the second garbage collection management table is configured to store a valid page count of each of the second sub-blocks.

14. The storage device of claim 12, wherein:
each of the first sub-blocks is coupled to a first word line group comprising a plurality of first word lines stacked in a vertical direction,
each of the second sub-blocks is coupled to a second word line group comprising a plurality of second word lines stacked in the vertical direction, and
a number of first word lines comprised by the plurality of first word lines is different from a number of second word lines comprised by the plurality of second word lines.

15. The storage device of claim 12, wherein:
the first sub-blocks respectively correspond to first memory stacks,
each of the first memory stacks extends in a vertical direction on a substrate,
the second sub-blocks respectively correspond to second memory stacks, and
each of the second memory stacks extends in the vertical direction on the first memory stacks.

16. The storage device of claim 12, wherein the processor is further configured to:
update the first garbage collection management table after copying the valid page of the first victim sub-block to the first target sub-block; and update the second garbage collection management table after copying the valid page of the second victim sub-block to the second target sub-block.

17. The storage device of claim 12, wherein the processor is further configured to:
control, in a first mode, a first erase operation on the non-volatile memory in sub-block units; and
control, in a second mode, a second erase operation on the non-volatile memory in block units,
wherein each of the block units comprise at least two sub-blocks.

18. The storage device of claim 12, wherein the processor is further configured to:
select the first victim sub-block from among the first sub-blocks based on at least one of a program/erase cycle count and a page migration time of each of the first sub-blocks; and
select the second victim sub-block from among the second sub-blocks based on at least one of a program/erase cycle count and a page migration time of each of the second sub-blocks.

19. An operating method of a processor of a storage device, the operating method comprising:
selecting a victim sub-block from among first sub-blocks and second sub-blocks of a non-volatile memory, each of the first sub-blocks having a first block size, each of the second sub-blocks having a second block size, the second block size being different from the first block size;
copying a valid page of the victim sub-block to a target sub-block having a same block size as the victim sub-block; and
performing an erase operation on the victim sub-block,
wherein the selecting of the victim sub-block comprises at least one of:
selecting, as the victim sub-block, a sub-block having a smallest ratio value of a valid page count to an invalid page count from among the first sub-blocks and the second sub-blocks;
selecting, as the victim sub-block, a sub-block having a largest difference value between the invalid page count and the valid page count from among the first sub-blocks and the second sub-blocks; or
selecting, as the victim sub-block, a sub-block having a smallest ratio value of the valid page count to a block size from among the first sub-blocks and the second sub- blocks.

20. The operating method of claim 19, wherein:
the first sub-blocks respectively correspond to first memory stacks on a substrate, and
the second sub-blocks respectively correspond to second memory stacks on the first memory stacks.

* * * * *